United States Patent [19]

Koshiba et al.

[11] Patent Number: 5,593,646
[45] Date of Patent: Jan. 14, 1997

[54] METHOD FOR PRODUCING AN EXHAUST GAS CLEANING METAL CARRIER

[75] Inventors: Yoshikazu Koshiba; Yasuhide Kuroda; Yukio Aoki; Tsuyoshi Minakata; Masaru Iizuka, all of Tokyo, Japan

[73] Assignee: Nippon Yakin Kogyo Co., Ltd., Tokyo, Japan

[21] Appl. No.: 381,822
[22] PCT Filed: Jun. 7, 1994
[86] PCT No.: PCT/JP94/00919
§ 371 Date: Feb. 3, 1995
§ 102(e) Date: Feb. 3, 1995
[87] PCT Pub. No.: WO94/29062
PCT Pub. Date: Dec. 22, 1994

[30] Foreign Application Priority Data

| Jun. 7, 1993 | [JP] | Japan | 5-135699 |
| Dec. 27, 1993 | [JP] | Japan | 5-332805 |
| Dec. 27, 1993 | [JP] | Japan | 5-332806 |
| Dec. 27, 1993 | [JP] | Japan | 5-332807 |

[51] Int. Cl.$^6$ ................................. B01D 50/00
[52] U.S. Cl. ........................ 422/177; 55/523; 55/524; 422/211; 422/312
[58] Field of Search .................... 422/177, 181, 422/211, 218, 312; 55/523, 524, DIG. 5; 264/DIG. 48; 29/890

[56] References Cited

U.S. PATENT DOCUMENTS

| 4,381,590 | 5/1983 | Nonnenmann et al. | 29/157 R |
| 4,385,032 | 5/1983 | Fratzer et al. | 422/181 X |
| 4,400,860 | 8/1983 | Nonnenmann et al. | 29/890 |
| 4,519,120 | 5/1985 | Nonnenmann et al. | 29/890 |
| 4,521,947 | 6/1985 | Nonnenmann et al. | 422/181 X |
| 4,665,051 | 5/1987 | Nonnenmann | 502/439 |
| 4,795,615 | 1/1989 | Cyron et al. | 422/181 X |
| 4,847,966 | 7/1989 | Kuchelmeister | 29/890 |

FOREIGN PATENT DOCUMENTS

| 2-83320 | 6/1990 | Japan |
| 2-85815 | 7/1990 | Japan |
| 2-85814 | 7/1990 | Japan |
| 0429750 | 1/1992 | Japan |
| 4148016 | 5/1992 | Japan |
| 4141238 | 5/1992 | Japan |
| 4-78938 | 7/1992 | Japan |

OTHER PUBLICATIONS

English Language Abstract of Japanese Laid Open Application No. 4-290554 (1992).
English Language Abstract of Japanese Laid Open Application No. 1-5663 (1989).

*Primary Examiner*—Robert Warden
*Assistant Examiner*—Krisanne M. Thornton
*Attorney, Agent, or Firm*—Sherman and Shalloway

[57] ABSTRACT

A metal carrier and a production method thereof for carrying an exhaust gas cleaning catalyst for automobiles, autobicycles, and industrial equipment. The metal carrier includes a metal honeycomb core body pressed into a metal outer cylinder, and the joined portion of the a flat plate and a corrugated plate forming the metal honeycomb core body includes a solder material coated in spots or stripes at peaks of corrugation of the corrugated plate. The solder material in the joined portion of the flat plate and the corrugated plate has a thickness of less than 100 μm, the positions of the joined portions are different between the surface and backside of the flat plate and corrugated plate, and the joined portions are present through an unjoined area having a length of more than 5% of the length of the metal honeycomb core body from an end face of the metal honeycomb core body at the exhaust gas inlet side.

12 Claims, 12 Drawing Sheets

5,593,646

METHOD FOR PRODUCING AN EXHAUST GAS CLEANING METAL CARRIER

This application is based on International Application No. PCT/JP94/00919, filed Jun. 7, 1994.

TECHNICAL FIELD

This invention relates to a metal carrier for carrying an exhaust gas cleaning catalyst for automobiles, autobicycles, and industrial equipment, and a production method thereof.

BACKGROUND TECHNOLOGY

As a catalyst carrier for cleaning exhaust gas of automobiles, a honeycomb-formed metal carrier comprising heat-resistant stainless steel is known. The metal carrier is formed by winding round a stack of a flat plate and a corrugated plate to form a honeycomb core body and joining the outer periphery of the honeycomb core body and inner surface of a metal outer cylinder.

Various methods are known as the production method of the metal carrier. For example, Japanese Patent Publication 63-44466 describes a metal carrier in which a pile of a flat plate and a corrugated plate is wound round, and the vicinity at least one of end faces of the wound honeycomb core body is soldered. However, such a metal carrier, when actually used on an internal combustion engine for automobile, tends to undergo deformation of the honeycomb core body or breakage of a foil on an outer periphery of the honeycomb core body due to thermal fatigue by heat cycle of heating and cooling. In particular, the exhaust gas inlet side of the honeycomb core body undergoes considerable cell deformation and foil breakage because it is exposed to high-temperature exhaust gas. Further, the metal carrier may be broken at the joined portion due to engine vibration and vibration during traveling.

Further, Japanese Patent Laid-open Publication 56-4373 discloses a honeycomb core body produced by a method in which solder is coated on a flat steel plate or at peaks of a corrugated steel plate through a supply roller from a vessel filled with liquid solder paste, and the former is wound round with a corrugated steel plate, or the latter is wound round with a flat steel plate. The patent also discloses a honeycomb core body produced by a method in which before coating solder, an adhesive is coated at a position to be solder coated through a supply device, and wound round while sprinkling a powder-formed solder material by a distribution device. In these honeycomb core bodies, the powder-formed solder material is piled in layers between the flat steel plate and the corrugated steel plate. Further, since the stack of the powder-formed solder material particles between the flat steel plate and the corrugated steel plate exists in amounts of twice the number of turns from the center of the honeycomb core body to the outermost periphery, when treated by vacuum soldering, the solder material melts to generate voids between the flat steel plate and the corrugated steel plate, and the voids in layers collect at several positions. Therefore, the honeycomb core body obtained by this method has unsoldered portions between the flat steel plate and the corrugated steel plate. Further, since the solder thickness increases at the joined portion of the flat steel plate and the corrugated plate, the core body tends to break at the brittle solder material and is insufficient in strength.

As another method, Japanese Patent Laid-open Publication 4-141238 discloses a production method of a metal carrier, in which a plurality of binder injectors having needles on the surface and backside of a corrugated foil are disposed in a single or multiple stages parallel to the corrugation, and operation of the binder injectors is selected so that the binder is coated at peaks of the corrugation in a previously designed range according to the movement of the corrugated foil to select joining positions of the corrugated foil and flat foil at desired positions of the honeycomb core body.

In producing a honeycomb core body by this method, to select a joining position of the corrugated foil and flat foil at a desired position of the honeycomb core body, first only the binder is supplied, after winding the honeycomb core body, or after containing it in an outer cylinder, a process to sprinkle the solder material from the end face of the honeycomb core body to apply the solder material to the binder coating portion. This results in an increase in cost. Further, when the binder is roll coated on the corrugated plate or the flat plate before forming the honeycomb core body and the solder material is also supplied, wound round into the honeycomb core body, and then soldering is made, since the solder material is sandwiched between the flat plate and corrugated plate, the solder material melts by soldering treatment to generate voids between both plates, and effective joining is not obtained. This is also true for a slurry which is a mixture of the binder and powder-formed solder. Since the binder and powder-formed solder are sandwiched between the flat plate and corrugated plate, the solder material melts after soldering to generate voids between both plates, and cannot provide effective joining. When the slurry is coated on the same joining position of the surface and backside of the flat plate and corrugated plate, voids further increase between both plates due to melting of the solder material from the slurry sandwiched between the flat plate and corrugated plate, resulting in insufficient joining. Further, Ni, Cr, and Si, which are ingredients of the solder material, diffuse into the base material, and formation of an intermetallic compound concentrates in a same position, degrading the strength.

Then, there have heretofore been known various types of exhaust gas cleaning apparatus, in which a metal honeycomb body is inserted into a metal outer cylinder, and a gas cleaning catalyst is carried on the metal honeycomb body. In particular, various types of honeycomb structures have been proposed to control or prevent peeling or damage of the joined portion due to a strain caused by a thermal stress generated by heat of exhaust gas of automobiles. For example, Japanese Patent Laid-open Publication 4-29750 discloses a metal carrier in which a metal honeycomb core body and an outer cylinder are joined with a plurality of bands formed at 1–15 mm ring-formed intervals in an axial direction of the metal carrier. This absorbs a stress generated in the axial direction of the carrier during cooling/heating cycle by deforming an unjoined portion at the ring-formed spacing to disperse a stress acting on the joined portion and unjoined portion. However, in some cases, depending on the joining condition of the metal honeycomb core body, the stress cannot be efficiently dispersed even by joining the plurality of bands between the outer cylinder and the metal honeycomb core body. For example, when the boundary of the metal honeycomb core body and the outer cylinder is in line with the boundary in the metal honeycomb core body, the stress is concentrated at that position due to the heat cycle, and the foil is broken from that position. Further, Japanese Patent Laid-open Publication 4-148016 discloses a metal carrier which has a region where a flat foil and a corrugated foil are joined in an axial direction in a length of 5 to 20% the axial direction length of the metal honeycomb core body. An outer layer reinforcing layer is joined in an axial direction within five layers from the outer most layer towards the inside, and the metal outer cylinder and the metal honeycomb core body are joined in a region in the axial direction within the outer layer reinforcing layer. In this case, the metal outer cylinder and the metal honeycomb core body are joined at a position in the axial direction to relax the thermal deformation in the axial direction of the metal outer cylinder and the metal honeycomb core body. However, because the metal outer cylinder and the metal honeycomb core body are joined only at a position, mechanical vibrations of the engine or vibrations of the vehicle during traveling tend to concentrate in the joined portion, leading to a breakage.

Further, Japanese Utility Model Laid-open Publication 2-83320 describes an exhaust gas cleaning apparatus comprising a plurality of metal honeycomb core bodies having a number of reticulated ventilation holes in an axial direction formed by stacking thin flat band materials and corrugated band materials to contact each other, mounted at intervals in a metal case with both ends open. Thus, an exhaust gas cleaning apparatus in which at least one position is joined is disclosed, except for a case that a contact surface of the outer peripheral surfaces of the individual metal honeycomb core bodies and the inner wall surface of the metal case are simultaneously joined with the inner wall surface of the metal case in the vicinity of both ends of the metal honeycomb core body. Japanese Utility Model Laid-open Publication 2-85814 describes an exhaust gas cleaning apparatus which comprises two metal honeycomb core bodies having a number of reticulated ventilation holes in the axial direction, manufactured by stacking thin metal flat band materials and corrugated band materials to contact each other, mounted with spacing in a cylindrical metal outer cylinder having both ends open and an enlarged diameter section, wherein the outer peripheral surface in the vicinity of the opening of the metal outer cylinder of each metal honeycomb core body is mounted to the inner wall surface of the metal outer cylinder, and the outer peripheral surface in the vicinity of the spacing of the individual metal honeycomb core bodies does not contact the inner wall surface of the metal outer cylinder.

In these exhaust gas cleaning apparatus, a plurality of metal honeycomb core bodies are disposed at spaces in a metal outer cylinder, and only a portion in the axial direction of the contact surface of the outer peripheral surface of the individual metal honeycomb core body and the inner wall surface of the metal outer cylinder is annularly joined, preferably over the entire periphery to disperse and relax thermal stress, thereby preventing peeling of the outer peripheral surface of the metal honeycomb core body and the inner wall surface of the metal outer cylinder or peeling or cracking of the flat plates and the corrugated plates forming the metal honeycomb core bodies due to thermal stress and thermal deformation.

However, even when thermal stress is dispersed and relaxed by the above method, it is impossible to absorb a strain in the vicinity of the outer peripheral surface of the metal honeycomb core body due to thermal stress and thermal deformation generated in the exhaust gas cleaning apparatus. Therefore, the vicinity of the peripheral surface is liable to be subjected to thermal stress and thermal deformation, resulting in cell deformation or peeling of the flat plate and corrugated plate. Further, joining the inner wall surface of the metal outer cylinder and the outer peripheral surface of the metal honeycomb core body at only a portion tends to weaken the joining, and cannot withstand the pressure of exhaust gas flow at high temperatures.

Further, in a conventional metal carrier, a plurality of metal honeycomb core bodies are joined at spaces in a metal outer cylinder (e.g. Japanese Utility Model Laid-open Publication 2-83320). In this carrier, in an attempt to remove thermal stress and thermal deformation generated in the metal carrier at high temperatures by only joining of the outer peripheral surface of the metal honeycomb core body and the inner wall surface of the metal outer cylinder, a strain occurs that cannot be removed, and the metal honeycomb core body may be broken by the strain if the metal honeycomb core bodies are not joined at spaces. This easily leads to a large-sized exhaust gas cleaning apparatus, except for a case to intentionally generate a turbulent flow. Further, as described in Japanese Utility Model Laid-open Publication 2-85815, a large-diameter section provided in the metal outer cylinder leads to a large-sized exhaust gas cleaning apparatus.

On the other hand, in an exhaust gas cleaning apparatus carrying a gas cleaning catalyst on a metal honeycomb core body, it has been known to use a curved metal carrier. For example, Japanese Utility Model Laid-open Publication 4-78938 proposes a curved metal carrier, in which flat plates and corrugated plates are stacked in alternation to form a honeycomb structure, and the honeycomb structure is inserted into an outer cylinder. In the metal carrier, arrays of slits is provided so that each slit has a length of more than one wave in the cross direction of the flat plates and corrugated plates, the slits are arranged at spaces in the longitudinal direction, and a number of the arrays are formed in parallel and shifted from each other.

However, in the curved metal carrier, since the flat plates and corrugated plates forming the metal honeycomb core body are provided with slits and inserted into a curved metal outer cylinder, if thermal stress and thermal deformation occur in the metal carrier at high temperatures, the slits expand to generate cracking, cell deformation, peeling of joined portions, and breakage of the metal honeycomb core body. Further, since the flat plates and corrugated plates have slits, when the metal honeycomb core body is inserted into the curved metal outer cylinder after the carrier is formed, the honeycomb structure cannot be maintained, and the predetermined cell structure cannot be maintained. That is, when designing a metal carrier, it is difficult to ensure the desired porosity ratio and surface area. Further, due to the slits, exhaust gas tends to flow only the vicinity of the outer peripheral surface of the curved metal outer cylinder, resulting in a considerably deteriorated efficiency of exhaust gas cleaning.

Then, the inventors have conducted intensive studies to solve such defects and found that flat plates and corrugated plates are soldered with a solder material coated in spots or stripes on the peaks of the corrugated plate to form a metal honeycomb core body, while the solder material coated on the metal honeycomb core body still has a fluidity and the solder material coated on the inner wall surface of the metal outer cylinder has no fluidity, the outer peripheral surface of the metal honeycomb core body and the inner wall surface of the metal outer cylinder are assembled, and then soldering heat treated, thereby sufficiently absorbing a thermal stress and achieving the present invention. Therefore, a primary object of the present invention is to provide a stable metal carrier which sufficiently absorbs a thermal stress and, when used on vehicles, can withstand practical use for an extended period of time.

DISCLOSURE OF THE INVENTION

In accordance with the present invention, there is provided an exhaust gas cleaning metal carrier composed of one or more metal honeycomb core bodies formed by joining a flat plate and a corrugated plate, and pressed into a metal outer cylinder, characterized in that the joined portion of the flat plate and the corrugated plate comprises a plurality of joining spots or stripes of a solder material coated at peaks of the corrugated plate, the solder material of the joined portion of the flat plate and the corrugated plate has a thickness of 100 µm or less, and the positions of the joined portions of the flat plate and the corrugated plate are offset between the front surface and the backside of the corrugated plate. There is in the honeycomb core an unjoined portion, i.e., solder-free portion, of a length of 5% or more of the length of the honeycomb core body from the metal honeycomb end face at the exhaust gas inlet side. Further, the metal honeycomb core body and the metal outer cylinder are joined with a solder material coated in stripes on the inner wall of the metal outer cylinder. The joined portion of the core body at the outermost periphery of the metal honeycomb core body is not in line with (i.e., is offset from) the joined portion of the core body with the metal outer cylinder, and the metal honeycomb core body is joined intermittently in the axial and peripheral directions. The metal outer cylinder is not limited to a circular form, but may be curved with a desired curvature.

There is further provided according to the present invention a method for producing a metal carrier matrix, characterized in that a plurality of slurry supplying devices having a nozzle are disposed in multiple stages parallel to the direction of corrugation of a corrugated plate, a slurry comprising a powder-formed solder material and a binder is coated by the slurry supplying devices at peaks of corrugation according to movement of the corrugated plate and at predetermined positions, the corrugated plate and a flat plate are stacked and wound round to form a metal honeycomb core body, a slurry comprising the powder-formed solder material and a binder is coated on an inner wall surface of a metal outer cylinder, then the metal honeycomb core body is pressed into the metal outer cylinder, and both parts are joined by vacuum soldering to obtain an exhaust gas cleaning metal carrier.

In the above production method, it is preferable that the slurry containing the powder-formed solder and the binder is coated by the slurry supplying devices, and then the slurry coated at peaks of the corrugation is spread by a brush or roll in longitudinal and cross directions of the corrugated plate to uniformalize the coating thickness.

By the above method, a metal honeycomb core body matrix can be obtained, in which the joined portions of the flat plate and the corrugated plate are present through unjoined portions having a length of more than 5% of the length of the metal honeycomb core body, and a plurality of joined bands perpendicular to the axial direction are present on one and the same surface of the metal honeycomb core body.

There is further provided according to the present invention a method for producing a metal carrier comprising a plurality of metal honeycomb core bodies pressed into a metal outer cylinder parallel to the axial direction, characterized in that peaks of the corrugated plate are coated with a slurry-formed solder material in spots or stripes, and a flat plate and the corrugated plate are stacked and wound round to form a metal honeycomb core body. On the other hand, an inner wall surface of the metal outer cylinder is coated with a solder material, while the slurry-formed solder material coated at peaks of the corrugated plate and the solder material coated on the inner wall surface of the metal outer cylinder has no fluidity, the metal honeycomb core body is pressed into the metal outer cylinder, the outer cylinder is curved as necessary, dried and soldering heat treated to join the metal honeycomb core body and the metal outer cylinder.

As another production method, which is particularly useful when the metal outer cylinder is curved, is now described. In this case a plurality of metal honeycomb core bodies formed by joining a flat plate and a corrugated plate are pressed into the curved metal outer cylinder parallel to the axial direction. Here too, peaks of the corrugated plate are coated with a slurry-formed solder material in spots or stripes, the flat plate and the corrugated plate are stacked and wound round to form a metal honeycomb core body. According to this embodiment, a solder material is coated on an inner wall surface, while the slurry-formed solder material coated at peaks of the corrugated plate has a fluidity and the solder material coated on the inner wall surface of the metal outer cylinder has no fluidity, the metal honeycomb core bodies are pressed into the metal outer cylinder, the metal outer cylinder is curved with a desired curvature, dried and soldering heat treated to join the metal honeycomb core bodies and the metal outer cylinder in the curved condition.

The present invention will now be described in detail. When the metal carrier is installed on an actual vehicle, it is subjected to cooling/heating cycles, and a temperature gradient occurs in the axial and radial directions.

Further, since most present metal carriers use, in the metal honeycomb core body, a ferrite type stainless steel containing a high concentration of Al, which is highly resistant to oxidation, the following stresses are applied between the metal honeycomb core bodies and between the metal honeycomb core body and the outer cylinder due to a difference in thermal expansion coefficient between the metal honeycomb core body and the metal outer cylinder and the temperature gradient occurring in the metal carrier.

In the radial direction of the honeycomb, the metal honeycomb core body is pressed against the outer cylinder due to thermal expansion of the metal honeycomb core body during heating (temperature of the metal honeycomb core body>temperature of the metal outer cylinder, thermal expansion coefficient of the metal honeycomb core body>thermal expansion coefficient of the metal outer cylinder), and a deformation occurs in the cell of the metal honeycomb core body. In particular, when the end surface of the metal honeycomb core body is bound by soldering, thermal stress due to thermal expansion cannot be relaxed, which causes buckling of the flat plate forming the metal honeycomb core body, and the cell deformation of the metal honeycomb core body is further increased. Further, the exhaust gas inlet side of the metal honeycomb core body is exposed to high-temperature exhaust gas compared to the outlet side, and the temperature is considered to be higher than 1,000° C. by a reaction between the exhaust gas and the catalyst. Therefore, cell deformation of the metal honeycomb core body is particularly considerable at the exhaust gas inlet side.

As described above, due to the cell deformation, the metal honeycomb core decreases in the core diameter, and a tensile force occurs between the metal outer cylinder and the metal honeycomb core body, resulting in a breakage in the foil of the outer periphery. To prevent this, the vicinity of the end surface at the exhaust gas inlet side, which is the most considerable in cell deformation, should not be bound. Further, to relax thermal stress in the axial and radial directions of the metal honeycomb core body, the metal honeycomb core body is joined in spots or a plurality of stripes in the axial direction.

Further, when joined portions of the metal honeycomb core bodies are in line with those of the metal outer cylinder and the metal honeycomb core body, those portions tend to be applied with a tensile stress to cause breakage in the outermost periphery of the metal honeycomb core body. To prevent this, joined portions of the outermost periphery of the honeycomb core body should not be in line with those of the metal outer cylinder to once separate the metal honeycomb core body from the metal outer cylinder.

On the other hand, in the axial direction, since the metal honeycomb core body is higher in temperature than the metal outer cylinder, the metal honeycomb core body tends to expand in the axial direction of the metal honeycomb core body more than the metal outer cylinder. Therefore, if the metal honeycomb core body and the metal outer cylinder are joined in two positions, a shearing stress applies to the joined portions. Further, the longer the joining intervals, the greater the expansion, the shearing stress applied to the joined portions becomes higher, resulting in breakage in the joined portions. To prevent this, the metal honeycomb core body is joined at one position in the axial direction, thereby relaxing thermal stress in the axial direction of the metal honeycomb core body. However, by joining at a single position, vibrations of the engine or during traveling tend to concentrate in one position, resulting in breakage at the joined portion. Therefore, intermittent joining at a plurality of positions is preferable in view of the joining strength and relaxation of thermal stress in the axial and radial directions.

The reason why the unjoined portion between the core body and the metal outer cylinder is more than 5% of the length of the metal honeycomb core body is that, as a result of heat cycle tests of the metal honeycomb core body bound at the end by soldering, considerable cell deformation is noted in a length less than about 5% of the length of the metal honeycomb core body.

Further, by joining with a plurality of joining bands perpendicular to the axial direction on the same surface of the metal honeycomb core body, strain generated in the axial direction is dispersed to reduce the strain acting on the boundary of the joined portion and unjoined portion.

In the present invention, the solder material of the joined portion of the flat plate and the corrugated plate has a thickness of 100 μm or less. In a test where the outer peripheral metal cylinder of the metal honeycomb core body is held, and the metal honeycomb core body is pressed by a punching rod to draw out the metal honeycomb core body, the relationship between the punching strength and the solder material thickness as shown in FIG. 1 is obtained. As a result, the punching strength is considerably reduced when the solder material thickness exceeds 100 μm. This is considered as due to the fact that breakage occurs in the base material at the solder material thickness of 100 μm or less, and breakage occurs in the solder material, which is brittle compared to the base material, when the solder material thickness is more than 100 μm. Therefore, the solder material of the joined portion of the flat plate and the corrugated plate is required to have a thickness of 100 μm or less.

Further, it has been known that when the flat plate and the corrugated plate are joined by soldering, Ni, Cr or Si as ingredients of the solder material diffuse into the base material to form an intermetallic compound. Therefore, when the soldered portions of the flat plate or the corrugated plate are juxtapose between the surface and the backside, formation of the intermetallic compound concentrates in the juxtaposed position, resulting in a reduction of strength. Therefore, the joined portions of the flat plate or the corrugated plate must be different (offset) between the surface and the backside.

In view of spreading of the solder material, the slurry coating positions on the surface and the backside of the corrugated plate are preferred to be apart from each other by 4 mm or more.

To produce a metal carrier which is superior in durability to extreme heat cycles and strong mechanical vibrations, the solder material must be supplied in spots or a plurality of stripes at a desired position apart by more than 5% of the length of the metal honeycomb core body from the end surface at the exhaust gas inlet side.

When soldering in stripes, soldering is easily achieved by supplying an amorphous foil solder to the desired positions other than the end surface. However, since the amorphous foil solder contains boron as an ingredient, when soldering, the boron tends to diffuse into the base material, reducing the heat resistance of the foil. Therefore, it is not preferable to use an amorphous foil solder containing boron.

Then, the present invention uses a powdered solder material which does not contain boron as an ingredient, which is mixed with a binder to form a slurry, supplied in stripes to a desired position at peaks of the corrugated plate, and a flat plate and the solder-coated corrugated plate are stacked and wound round to form a metal honeycomb core body.

Boron has an effect to improve wetting of the solder material, however, it is not preferable because it degrades the heat resistance and, in the present invention, the soldered portion tends to spread too much, resulting in overlapping of the joined portions of the flat plate and corrugated plate on the surface and backside.

Then, the structure of the metal carrier of the present invention will be described in detail.

The metal carrier according to the present invention, which has the above-described structure, may have any cross sectional shape, such as cylindrical, race track (i.e., and), or other form. The plurality of metal honeycomb core bodies pressed into the metal outer cylinder may contact each other, or may be apart from each other.

Production method of the metal carrier according to the present invention will be described.

First, a slurry containing a powdered solder material and a binder is coated by a nozzle or the like in spots or stripes at peaks of the corrugated plate, and the corrugated plate and a flat plate are stacked and wound round to form a metal honeycomb core body. This formation method is not specifically limited, but it is important to supply the solder material in spots or stripes at peaks of the corrugated plate. The thus formed metal honeycomb core body is pressed into the metal outer cylinder to join them. In the joining of the metal honeycomb core body and the metal outer cylinder, the metal honeycomb core body is pressed into the metal outer cylinder while the solder material coated on the metal honeycomb core body maintains a fluidity and the solder material coated on the inner wall surface of the metal outer cylinder has no fluidity. Since the metal honeycomb core body is pressed into the metal outer cylinder while the solder material maintains a fluidity, and the joining portions having the solder material between the flat plate and the corrugated plate are not yet joined, they can freely move their positions, and can thus maintain a condition of least strain. Since the solder material coated on the inner wall surface of the metal outer cylinder has no fluidity, the solder material does not flow when the metal honeycomb core body is pressed in, and can be joined at a predetermined position.

The individual metal honeycomb core bodies can be joined so that they are apart from each other when exhaust gas flow is intentionally made turbulent, or not apart from each other for otherwise. This enables a compact exhaust gas cleaning apparatus by the metal honeycomb core bodies disposed not apart from each other, except for a case where a turbulent flow is intentionally generated.

In the production method of a curved metal honeycomb carrier, after a plurality of uncurved metal honeycomb core bodies are pressed into the metal outer cylinder before soldering heat treatment, the result is curved with a desired curvature, or after a plurality of metal honeycomb core bodies are pressed into a metal outer cylinder which is previously curved with a desired curvature, and the result is soldering heat treated, thereby easily forming a curved metal carrier, which is highly resistant to thermal stress and thermal deformation at high temperatures.

An apparatus for coating a slurry, which is a mixture of a powdered solder material and a binder for joining the metal honeycomb core body formed by stacking and winding round a flat plate and a corrugated plate, at desired positions on the inner surface of the metal outer cylinder preferably comprises a metal outer cylinder carrying-in device, a metal outer cylinder rotating and supporting device, a solder material coating device for coating the solder material on the inner surface of the metal outer cylinder, a metal outer cylinder carrying-out and recovery device after solder material coating, and means for rotating the metal outer cylinder rotating and supporting device and operating the solder material coating apparatus when the metal outer cylinder is carried in by the metal outer cylinder carrying-in device.

That is, the coating apparatus has a solder material supply device for supplying the slurry as a mixture of the powdered solder material and the binder, a mechanism for evenly coating the solder material at a desired position of the inner surface of the metal outer cylinder, and a mechanism for rotating and supporting the metal outer cylinder and carrying the metal outer cylinder. The means for rotating the metal outer cylinder rotating and supporting device and operating the solder material coating apparatus when the metal outer cylinder is carried in by the metal outer cylinder carrying-in device which can be controlled, for example, by a sensor.

Figure 1:
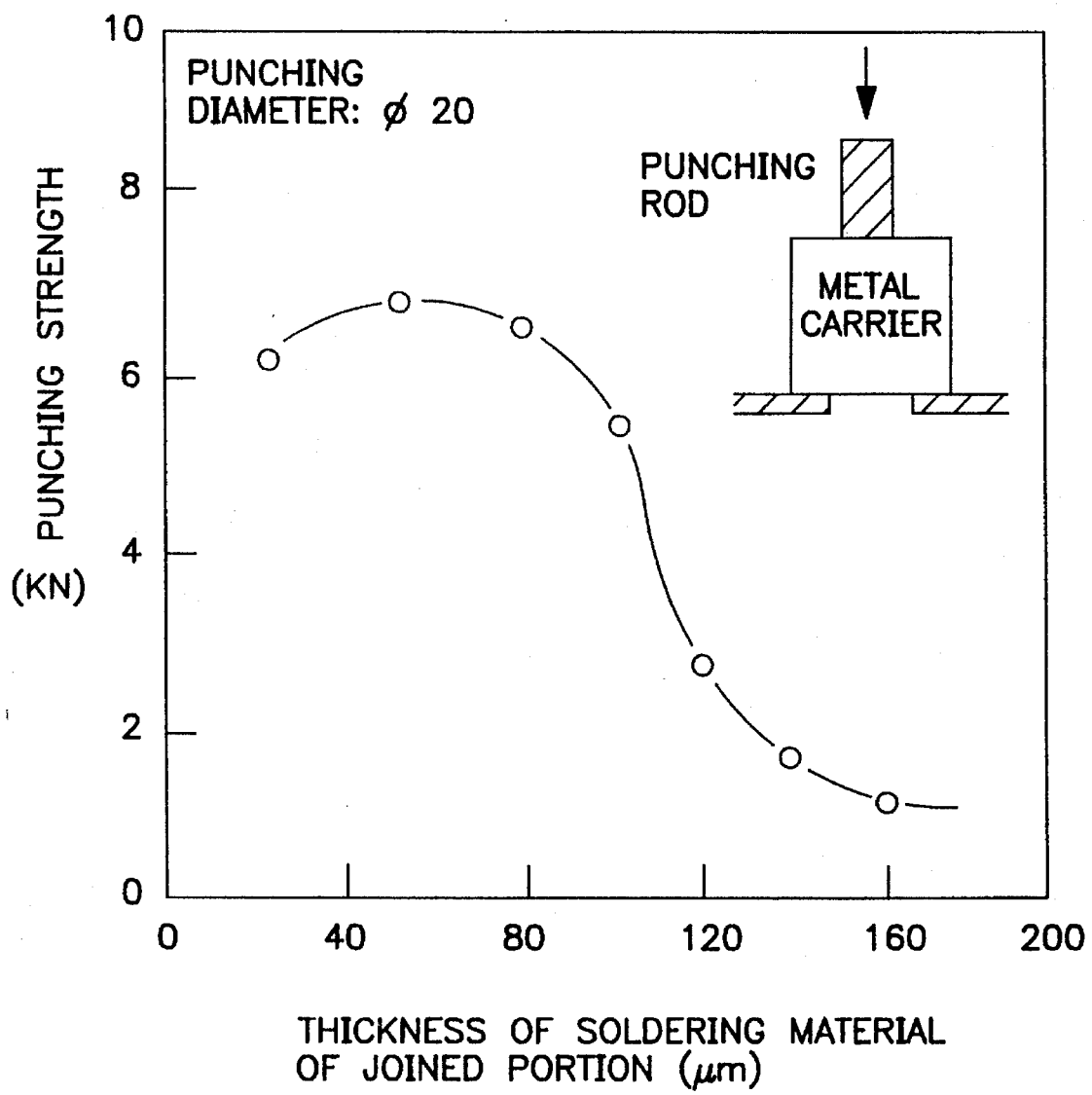
FIG. 1 is a graph showing the relationship between the solder material thickness and the punching strength of the joined portion of a flat plate and a corrugated plate of a metal honeycomb core body.

Then, the metal carrier of the present invention will be described with reference to the drawings, however, it is needless to say that the present invention is not limited to those shown in the drawings.

Figure 2:
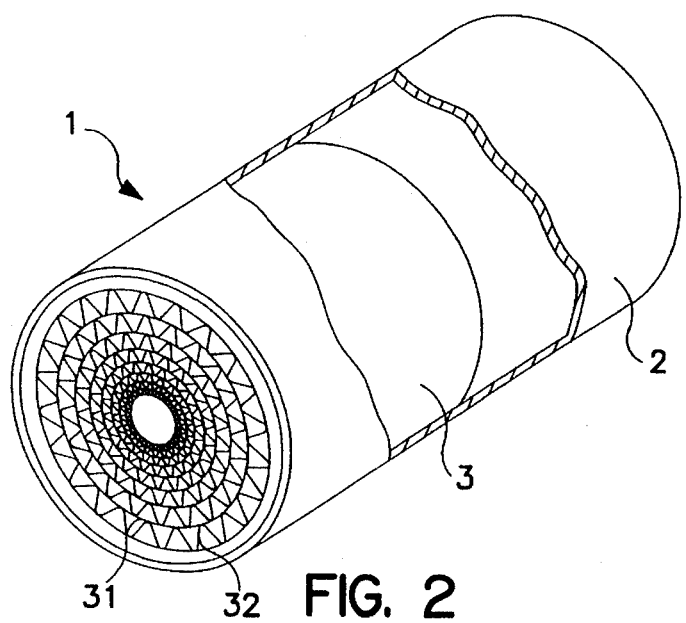
FIG. 2 is a schematic perspective view of a metal honeycomb carrier.
Figure 3:
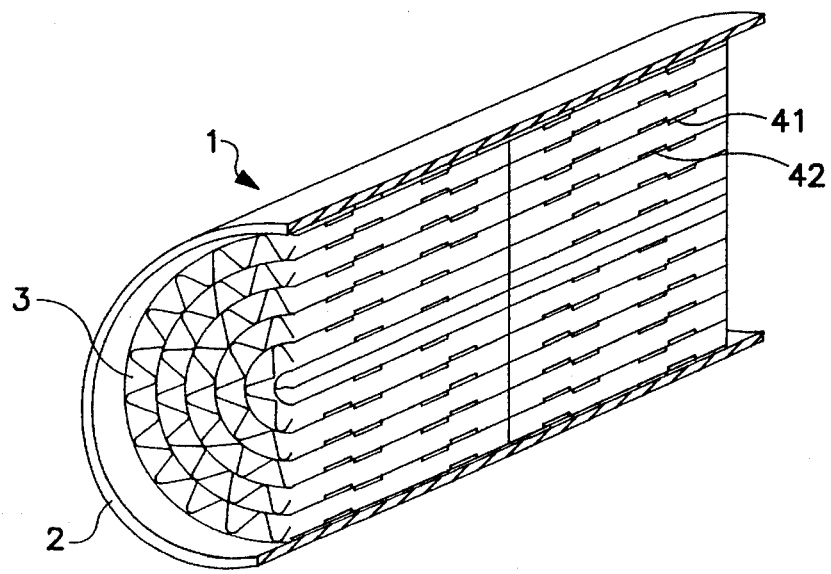
FIG. 3 is a schematic perspective cross sectional view of a metal carrier.
Figure 4:
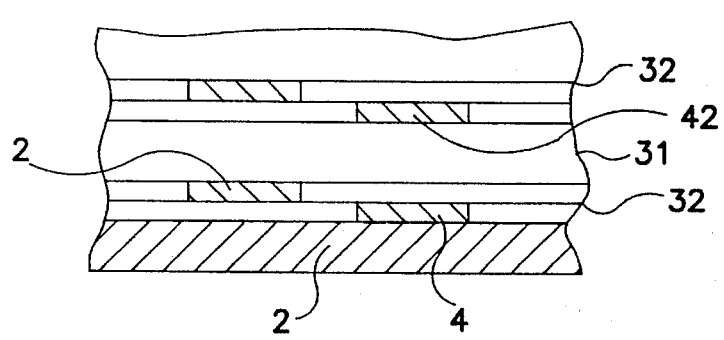
FIG. 4 is a schematic enlarged cross sectional view showing part of a joined portion of an inner wall surface of an outer cylinder and the metal carrier.

FIG. 2 is a schematic perspective view showing the metal carrier of the present invention, FIG. 3 is a schematic cross sectional perspective view of FIG. 2, and FIG. 4 is a schematic enlarged view showing joining of the inner wall surface of the metal outer cylinder and the metal honeycomb core body.

Referring to FIG. 2, a metal carrier 1 comprises a metal honeycomb core body 3 pressed in a metal outer cylinder 2. As shown in FIG. 4, the outermost periphery of the metal honeycomb core body 3 and the inner wall surface of the metal outer cylinder are soldered, the soldering being achieved by a solder material 4 in a plurality of stripes. The metal honeycomb core body 3 is formed by soldering a flat plate 31 and a corrugated plate 32. The soldering of the flat plate and the corrugated plate is achieved by a solder material 41, 42, ... coated in spots or stripes at peaks on the outer surface and inside surface, respectively, of the corrugated plate. The reference numeral 41, therefore, indicates a portion joined with the solder material between the flat plate and the corrugated plate and on the outside surface of the corrugated plate, and 42 indicates a portion joined with the solder material between the flat plate and the corrugated plate and on the inside surface of the corrugated plate. It is preferable that the positions of 41 and 42 are shifted from each other to reduce effects of the solder material on the base material (FIG. 4). Furthermore, although not clearly shown in FIG. 3 and FIG. 4, the stripes of solder material 4 should not be in line with (i.e., should be offset or displaced with respect to) solder material 41 at the outer periphery of the core body 3.

Figure 5:
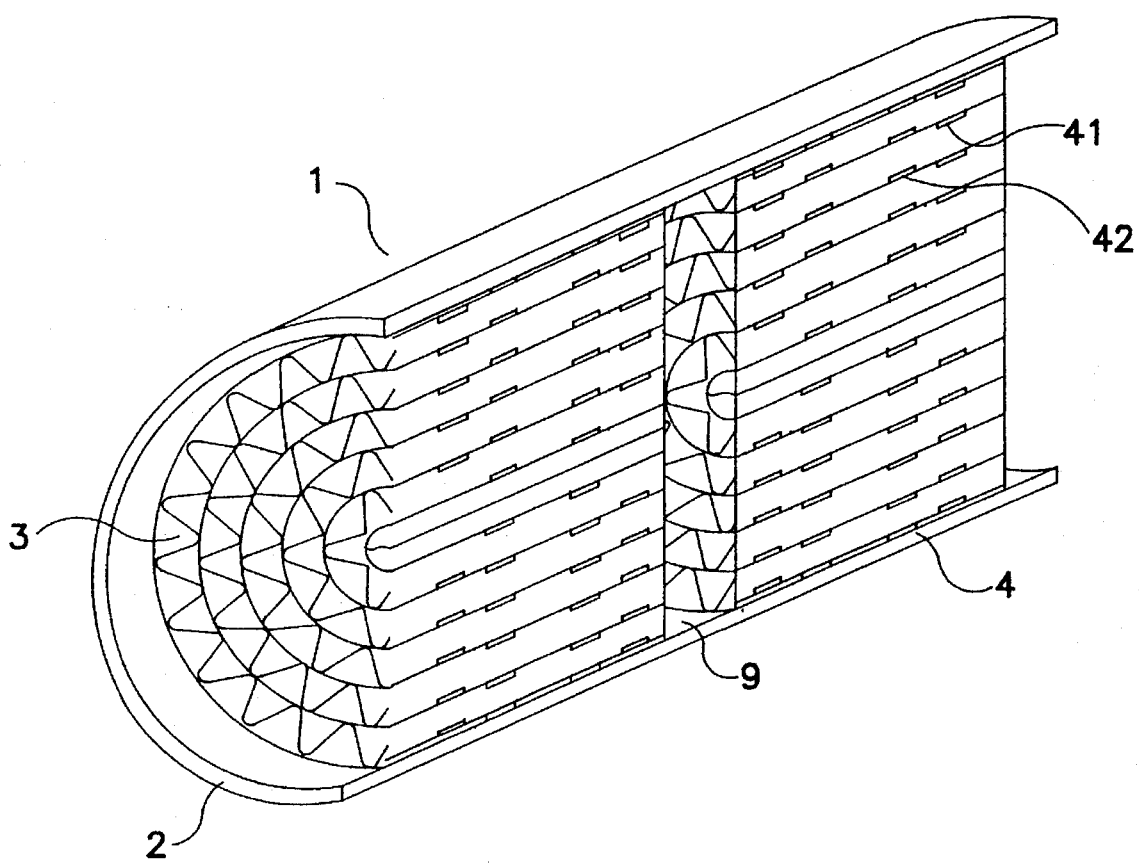
FIG. 5 is a schematic cross sectional view when two metal honeycomb core bodies apart from each other are pressed into a metal outer cylinder.

FIG. 5 is a schematic cross sectional perspective view showing a case when a separation part 9 is provided between two metal honeycomb bodies.

Then, the production method of the metal honeycomb core body of the present invention will be described with reference to the drawings.

Figure 6:
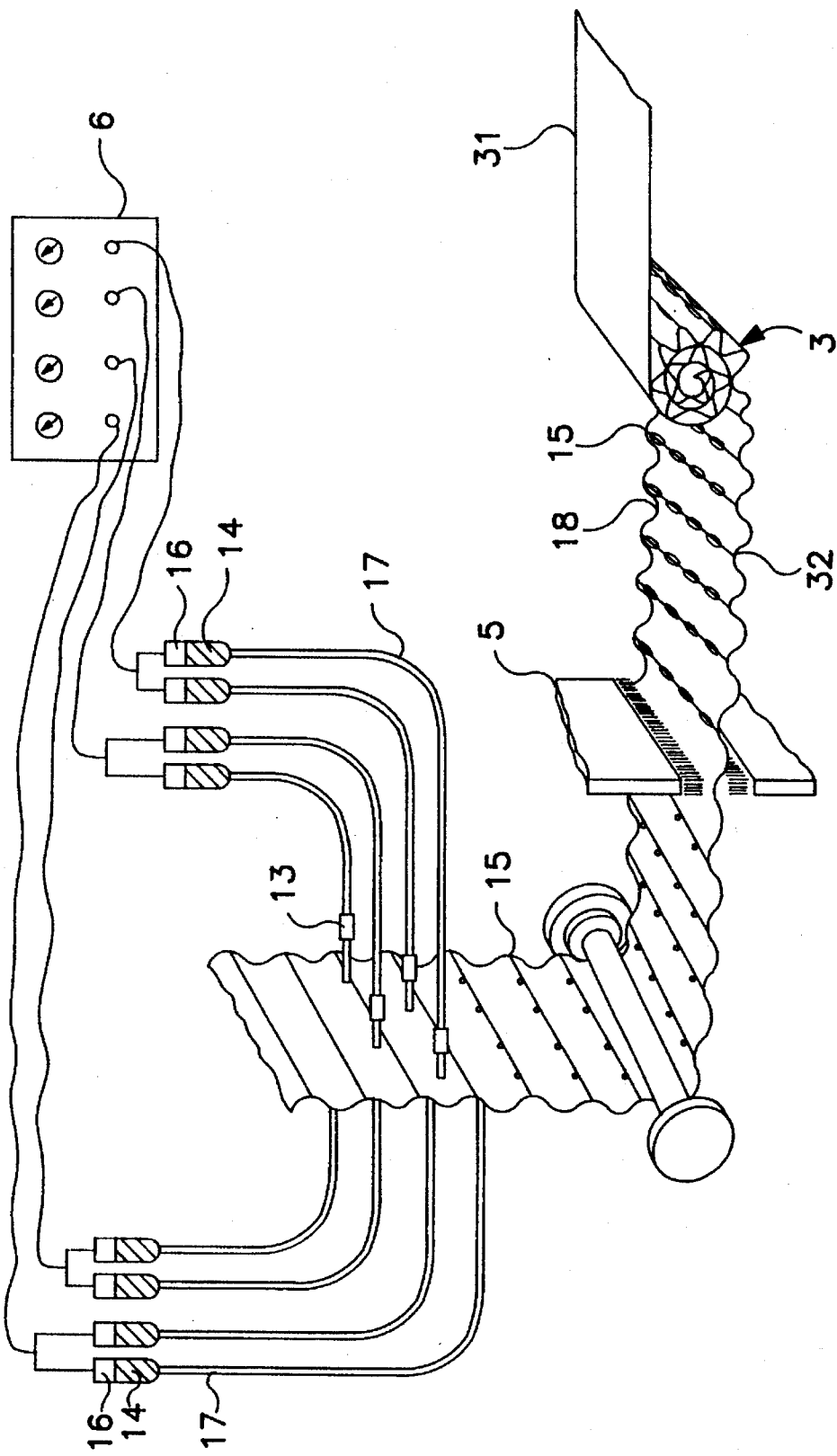
FIG. 6 is a schematic view for explaining the production method of the metal honeycomb core body of the present invention.

FIG. 6 is a schematic view for explaining the solder material coating method and the production method of the metal honeycomb core body of the present invention.

A slurry 14 produced by mixing a powdered solder material, free of boron, and a binder is charged in a reservoir tank 16. The reservoir tank 16 is provided with a slurry supply tube 17, and a tip thereof has a nozzle 13. The slurry 14 is fed through the slurry supply tube 17 to the nozzle 13. The reservoir tank 16 is disposed at a position of the same height as or lower than a corrugation peak 15 to be coated. The number of the reservoir tanks 16 may be the same as the number of the nozzles 13 or one. When a single reservoir tank 16 is used, the slurry supply tubes 17 of the same number of the nozzles 13 are attached to the reservoir tank 16, and the slurry 14 is branched by the slurry supply tubes to the individual nozzles 13.

By the use of the reservoir tank 16 and the slurry supply tube 17 to the nozzle 13, the slurry 14 can be supplied from the nozzle 13 to the corrugation peak 15 stably for an extended time, without requiring a space.

The nozzle 13 uses a flexible material, and is set between the corrugation peak 15 and a corrugation valley 18. The supplied slurry 14 is scraped by the corrugation peak 15 and coated thereon. Amount of the slurry 14 coated on the corrugation peak 15 is controlled only by adjusting the pressure of the reservoir tank 16 by a controller 6, without requiring a complex control.

The slurry 14 coated on the corrugation peak 15 is in a condition in which solder material particles are stacked in layers. When the flat plate and the corrugated plate are wound round in this condition to form a metal honeycomb core body and soldered, voids may be generated between the corrugated plate and the flat plate. Further, the solder material between the corrugated plate and the flat plate can have a thickness of more than 100 μm, with a considerably decreased punching strength. In the present invention, to uniformalize the coating thickness of the solder material, the solder material is spread by a brush 5 or a roll in the width direction and the longitudinal direction of the corrugation peak, and the solder material-coated corrugated plate 32 and the flat plate 31 are stacked and wound round to form the metal honeycomb core body 3, thereby preventing generation of voids and obtaining effective joined portions.

As the flat plate, for example, a heat-resistant steel of 20% Cr and 5% Al with a thickness of 0.05 mm and a width of 40 mm is used, and the flat plate is corrugated to be used as the corrugated plate.

As a method for joining the thus formed metal honeycomb core body 3 and the inner wall surface of the metal outer cylinder 2, an amorphous foil solder is wound round at a desired position on the outer periphery of the formed metal honeycomb core body 3, then the metal honeycomb core body 3 is pressed into the metal outer cylinder 2, and vacuum soldered. However, with this method, as described above, since boron contained in the amorphous foil solder diffuses into the base material of the metal honeycomb core body, the heat resistance is deteriorated.

Figure 7:
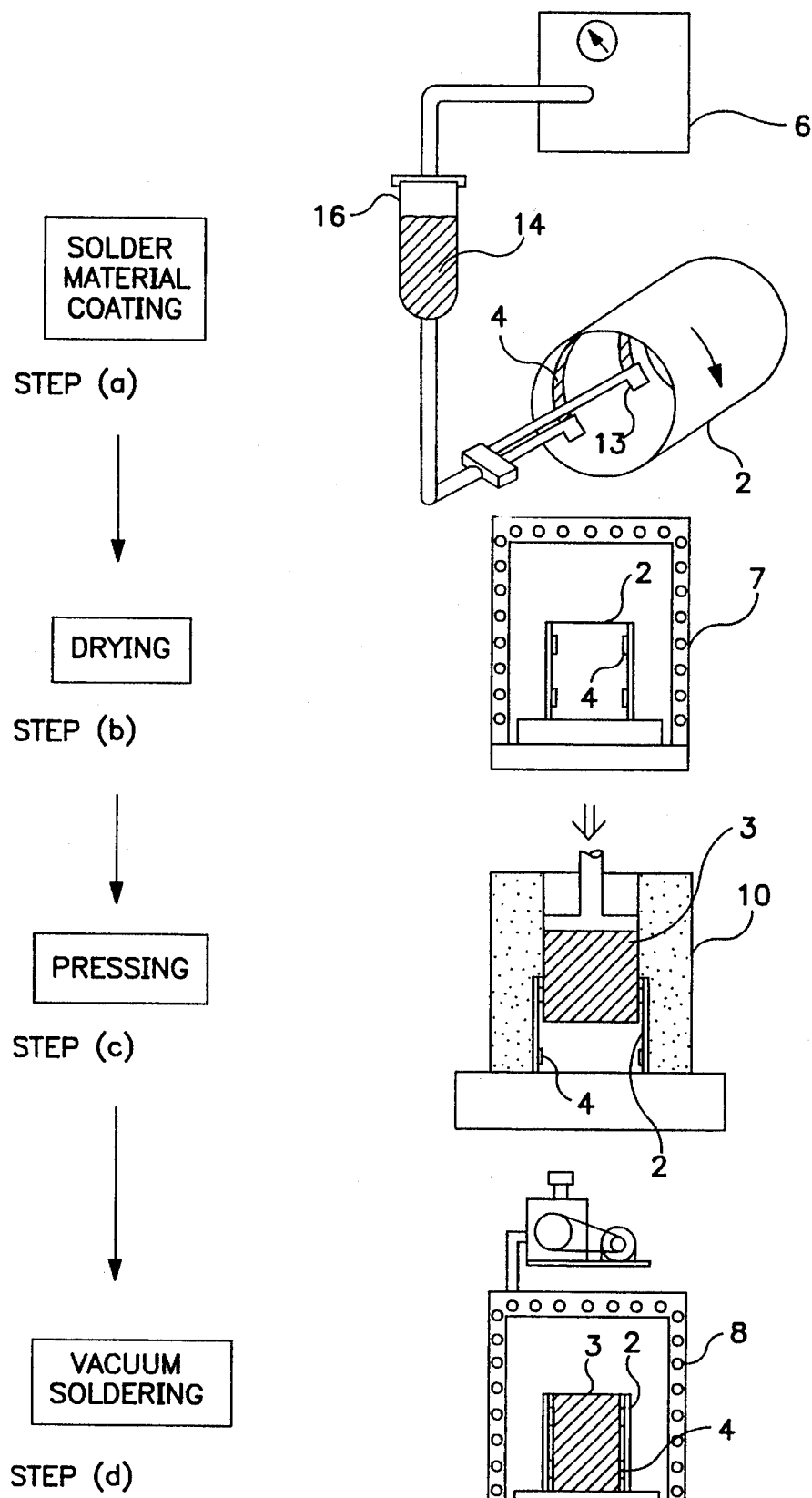
FIG. 7 is a schematic view showing a process from solder material supplying to the metal outer cylinder to vacuum soldering.

Therefore, in the present invention, the metal honeycomb core body 3 and the inner wall surface of the metal outer cylinder 2 are joined by the method shown in FIG. 7. Specifically, the slurry 14, obtained by previously mixing the powdered solder and a water-soluble or organic binder, is coated by the nozzle 13 at a desired position on the inner surface of the metal outer cylinder 2 (step a), and placed in a drying oven 7 to be dried (step b). Then, the metal honeycomb core body 3 is pressed using a pressing tool 10 into the metal outer cylinder (step c), and put in a vacuum soldering device 8 to be soldered (step d). In this step, if the metal honeycomb core body is pressed in without drying the solder material, the stripe of solder material 4 tends to move with the metal honeycomb core body in the pressing direction, and the solder material cannot be coated at the desired position. Therefore, it is preferable to press the metal honeycomb core body into the metal outer cylinder after drying the solder material. The vacuum soldering is preferably made at 1,100° to 1,300° C. for more than 10 minutes under vacuum.

Then, the production method of a curved metal carrier will be described in detail.

As shown in FIG. 6, a slurry-formed solder material is supplied to peaks on the surface and backside of the corrugated plate, obtained by corrugating a flat plate comprising a heat-resistant steel, and coated in spots, or in stripes by a brush as necessary. Then, the corrugated plate is stacked with a flat plate, and wound round to form a metal honeycomb core body. A plurality of the resulting metal honeycomb core bodies, while the slurry-formed solder material maintains a fluidity and the slurry-formed coated on the inner wall surface of the metal outer cylinder has no fluidity, are disposed with or without spacing in the metal outer cylinder, dried, and subjected to soldering heat treatment to simultaneously join the individual metal honeycomb core bodies, and the metal honeycomb core body and the metal outer cylinder with the solder material coated on the inner wall surface of the metal outer cylinder.

The resulting metal honeycomb core body 3 is pressed into the metal outer cylinder 2 using the method shown in FIG. 7(c).

Figure 8:
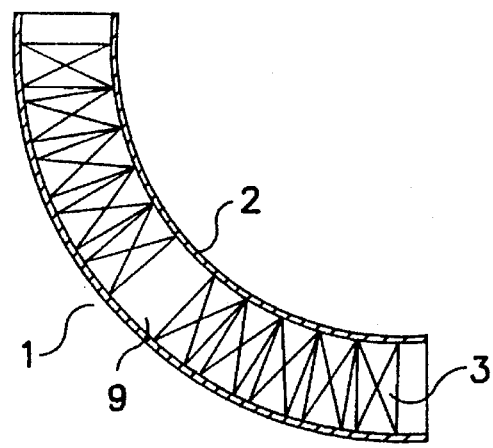
FIG. 8 is a schematic cross sectional plan view showing the curved metal carrier according to the present invention.
Figure 9A:
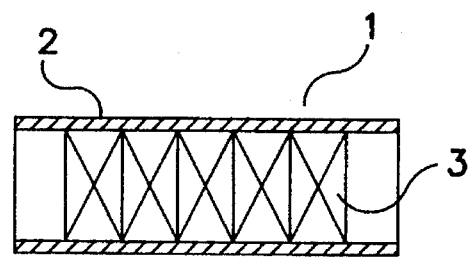
FIG. 9 is a schematic view showing the production method of the curved metal carrier of the present invention.
Figure 9B:
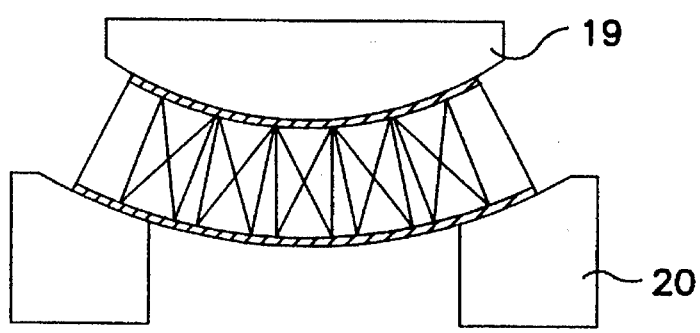
Figure 9C:
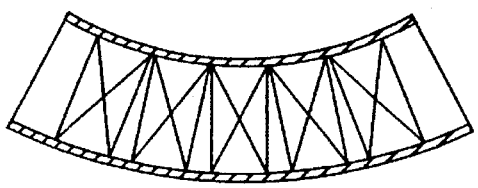

FIG. 8 is a schematic cross sectional view of the curved metal carrier of the present invention, and FIG. 9 explains the production method of the curved metal carrier. Referring to FIG. 9, after five units of the metal honeycomb core bodies 3 are pressed into the metal outer cylinder 2 (a), for example, the carrier 1 is placed on a support 20, and pressed by a pressing die 19 from the upper side (b) to obtain a metal carrier having a desired curvature (c).

To enhance the precision, the carrier may be again pressed to be shaped.

Then, a solder material coating apparatus for coating the solder material on the inner wall surface of the metal outer cylinder will be described.

That is, the present invention is directed to a solder material coating apparatus for coating the solder material on the inner surface of the metal outer cylinder comprising a solder material supplying device for supplying a slurry, which is a mixture of a powdered solder and a binder, a mechanism for uniformly coating the solder material at a desired position on the inner surface of the metal outer cylinder, and a mechanism for rotating and supporting the metal outer cylinder and carrying the outer cylinder. As means for rotating a metal outer cylinder rotating and supporting device when the metal outer cylinder is carried in a predetermined position by a metal outer cylinder carrying-in device, and operating the solder material coating apparatus, a sensor, for example, may be used.

Figure 10:
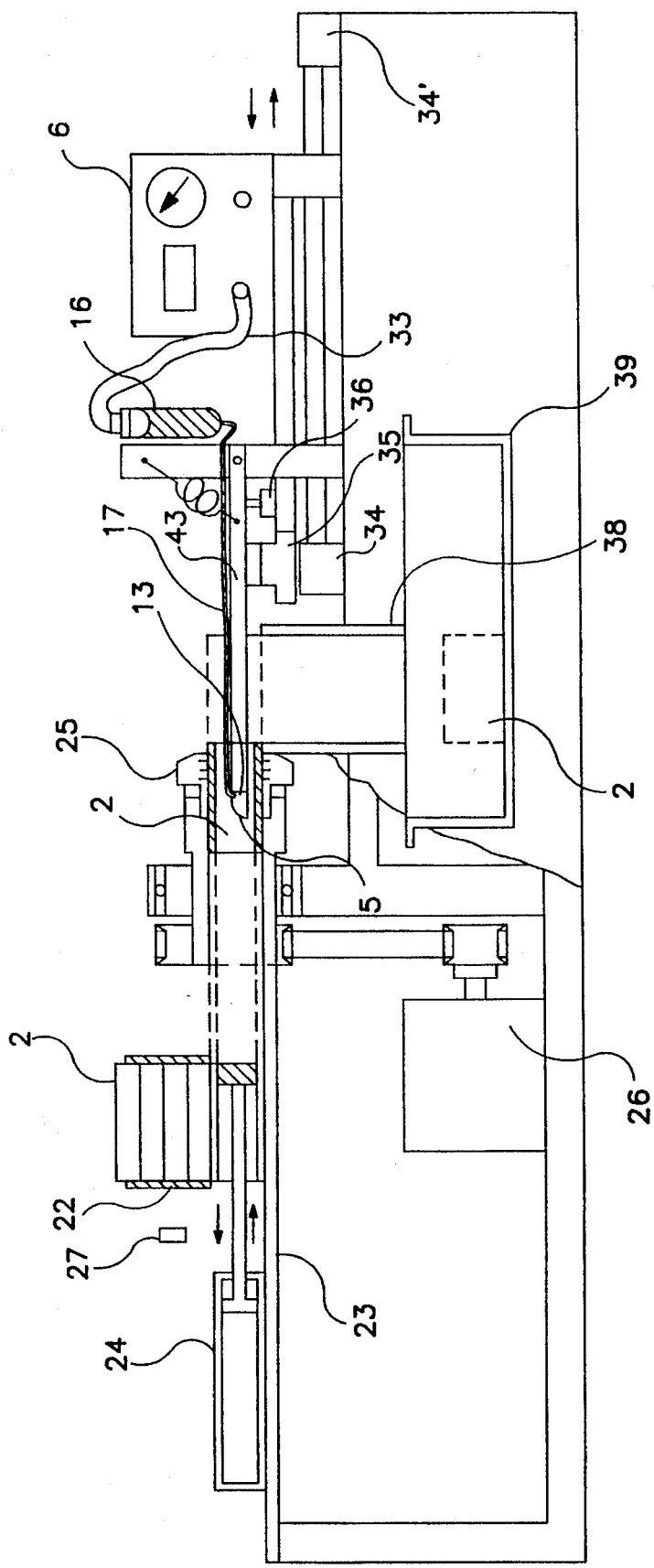
FIG. 10 is a schematic front view of a coating apparatus of the present invention.

FIG. 10 is a schematic view of the solder material coating apparatus. Roughly divided, this apparatus comprises a metal outer cylinder carrying-in device, a metal outer cylinder rotating and supporting device, a solder material coating device for coating the solder material on the inner surface of the metal outer cylinder, and a metal outer cylinder carrying-out and recovery device for carrying out and recovering the metal outer cylinder after solder material coating.

The metal outer cylinder carrying-in device and the metal outer cylinder rotating and supporting device will be described. The metal outer cylinder carrying-in device and the metal outer cylinder rotating and supporting device comprise a cylinder 24 for carrying in the metal outer cylinder, a chuck 25 for rotating and supporting the metal outer cylinder, a chuck drive motor 26 for rotating and supporting the metal outer cylinder, and a sensor 27. The metal outer cylinder is carried from a metal outer cylinder delivery carrying-in guide 22 to a metal outer cylinder support carrying-in guide 23. Then the metal outer cylinder is carried by a predetermined amount by the metal outer cylinder carrying-in cylinder 24 in the direction of the metal outer cylinder rotating and supporting chuck 25. After that, the cylinder 24 returns to the original position, the metal outer cylinder 2 at the metal outer cylinder carrying-in guide 22 is set in the metal outer cylinder carrying-in guide 23 by its own weight. The metal outer cylinder 2 carried to the metal outer cylinder rotating and supporting chuck 25, when the sensor 27 detects that the cylinder 24 returns to the original position, is clamped by the metal outer cylinder rotating and supporting chuck 25. Then, the metal outer cylinder rotating and supporting chuck 25 is automatically rotated by the motor 26.

Then, the solder material coating device for coating the solder material on the inner surface of the metal outer cylinder will be described. The solder material coating device comprises a solder material supply controller 28, a slurry tank 29 for holding a slurry as a mixture of a powdered solder material and a binder, a nozzle 30 for injecting the slurry on the inner surface of the metal outer cylinder 2, a brush or roller 11 for uniformalizing the thickness of the slurry injected and spreading the slurry in the width direction, a movable table 33 for moving a holding tool 43 mounting the nozzle 30 and the brush or roller 11 to the right and left, and an electromagnet 35 for vertically moving a sensor/stopper 34 for adjusting the moving length of the holding tool 43. After the metal outer cylinder is clamped and rotated by the metal outer cylinder rotating and supporting chuck 25, the movable table 33 moves to insert the holding tool 43 mounted to the movable table 33 into the metal outer cylinder 2. The insertion length is controlled by the stopper 34. When the sensor/stopper 34 is contacted by the movable table 33, the electromagnet 35 is energized to attract the holding tool 43. As a result, the nozzle 30 and the brush or roller 11 mounted to the tip of the holding tool 43 are contacted with the inner surface of the metal outer cylinder 2. When the holding tool 43 is attracted by the electromagnet 35, a detector 36 operates. As a result, the slurry is fed by the controller 28 from the slurry tank 29 through a tube 37, and injected from the nozzle 30 onto the inner surface of the metal outer cylinder 2. The injected slurry is uniformalized by the brush or roller 11 to a uniform thickness and spread in the width direction. The amount of the slurry injected from the nozzle 30 is controlled according to the injection time and injection pressure of the controller 28.

After the solder material is coated on the inner surface of the metal outer cylinder 2 for a predetermined time, the holding tool 43 is separated from the electromagnet 35, and the movable table 33 moves to the original position. When the sensor 34' detects that the movable table 33 returns to the original position, the cylinder 24 operates again to carry the metal outer cylinder to the metal outer cylinder rotating and supporting chuck 25. At this moment, the solder material-coated metal outer cylinder is pushed out by the next metal outer cylinder, and carried by the metal outer cylinder carrying-out guide 38 to the metal outer cylinder recovery box 39.

The above procedure is automatically repeated.

BEST MODE FOR PRACTICING THE INVENTION

Then, the present invention will be described further in detail with reference to the embodiments.

EXAMPLE 1

Figure 11:
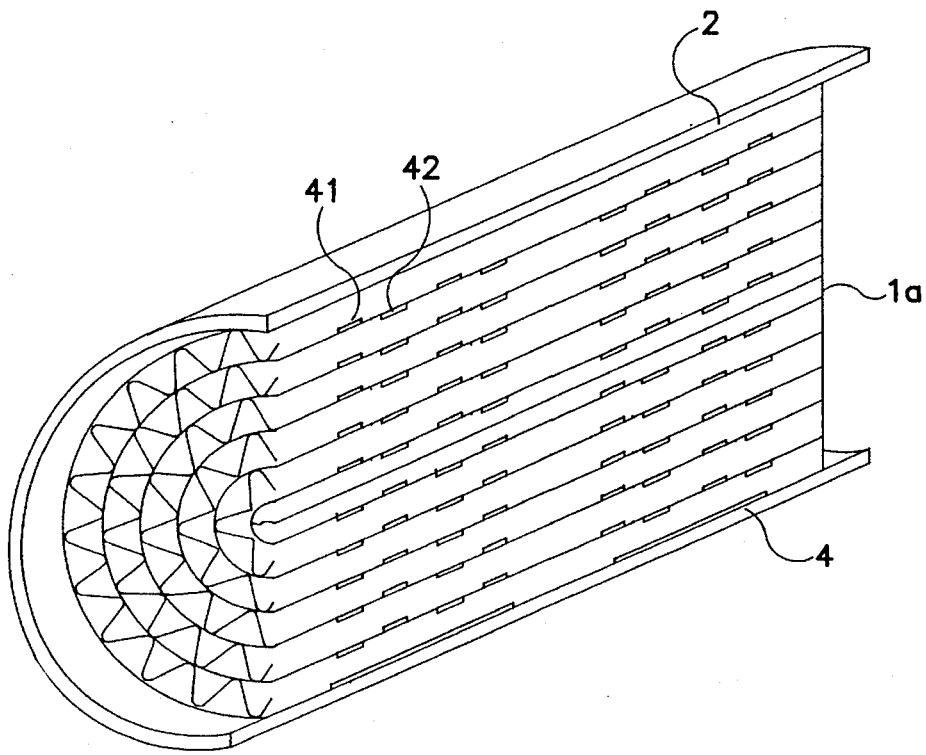
FIG. 11 is a schematic cross sectional view showing soldering condition of the metal carrier of Example 1 of the present invention.

A corrugated plate, formed by corrugating a 50 µm thick ferrite-type stainless steel flat plate, was supplied on the surface and backside with a slurry comprising a powder-formed solder material under 50 µm and a water-soluble binder from a nozzle at positions of 5 mm and 15 mm, respectively, from the end face on the surface, and at positions of 10 mm and 20 mm, respectively, from the end face on the backside, spread by a brush to a width of 2 mm and a solder material coating thickness of less than 50 µm, stacked with a flat plate and wound round to form a metal honeycomb core body. Next, a slurry comprising the powder-formed solder material and an organic binder was coated on an inner surface of a 1.5 mm thick metal outer cylinder in a width of 15 mm from a position 5 mm apart from the end face of the metal honeycomb core body and dried, and then the above honeycomb core body was pressed into the metal outer cylinder. After that, vacuum soldering (heated at 1,200° C. for 20 minutes, $10^{-5}$ torr) was performed to prepare a 50 mm diameter, 50 mm long metal carrier (length of metal honeycomb core body: 40 mm). The honeycomb carrier prepared by this method is shown in FIG. 11. In FIG. 11, the reference numeral 41 denotes a solder material on the surface of the corrugated plate, 42 denotes a solder material on the backside, and 1a denotes an exhaust gas inlet side end face. The honeycomb carrier had an unjoined area of a length of 10% of the length of the metal honeycomb core body from the exhaust gas inlet side end face 1a, and the metal honeycomb core body was joined to outer cylinder 2 with four joining stripes 4 perpendicular to the axial direction on the same surface. Further, the average joining interval of the flat plate and the corrugated plate was about 45 µm.

A catalyst was carried on this metal carrier, and subjected to a heat cycle test (1,000° C.×30 min→cooling×10 min). After the test for 300 hours, the metal carrier of the present invention showed no breakage of the foil except for a slight cell deformation in the metal honeycomb core body comprising the corrugated plate and the flat plate. Further, to test durability to vibrations, the metal carrier was tested at vibration frequencies of 20 to 500 Hz, an acceleration of 30G, for 20 hours. As a result, no defects such as dislocation of the honeycomb core, breakage of the soldered portion, or the like were noted.

EXAMPLE 2

Figure 12:
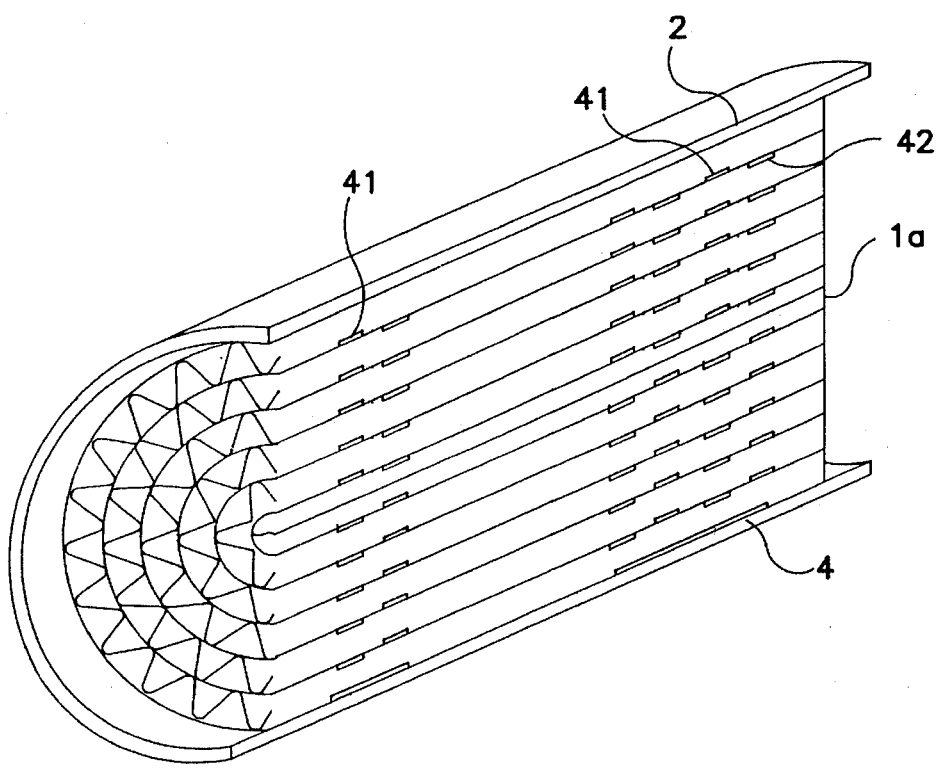
FIG. 12 is a schematic cross sectional perspective view showing soldering condition of the metal carrier of Example 2 of the present invention.

A corrugated plate, formed by corrugating a 50 μm thick ferrite-type stainless steel flat plate, was supplied on the surface and backside with a slurry comprising a powder-formed solder material under 50 μm and a water-soluble binder from a nozzle, at the exhaust gas inlet side at a position of 4 mm from the end face on the surface, and at a position of 8 mm from the end face on the backside, and at the exhaust gas outlet side at positions of 8 mm and 16 mm on the surface and at positions of 4 mm and 12 mm from the end face on the backside, and spread by a brush to a width of 2 mm and a solder material coating thickness of less than 50 μm, stacked with a flat plate and wound round to form a metal honeycomb core body. Next, a slurry comprising the powder-formed solder material and an organic binder was coated on an inner surface of a 1.5 mm thick metal outer cylinder at the exhaust gas inlet side in a width of 8 mm from a position 4 mm apart from the end face, and at the exhaust gas outlet side in a width of 15 mm from a position 4 mm apart from the end face, and dried, and then the above metal honeycomb core body was pressed into the metal outer cylinder. After that, vacuum soldering (heated at 1,200° C. for 20 minutes, $10^{-5}$ torr) was performed to prepare a 50 mm diameter, 50 mm long metal carrier (length of metal honeycomb core body: 40 mm). The honeycomb carrier prepared by this method is shown in FIG. 12. In FIG. 12, the reference numeral 41 denotes a solder material on the surface, 42 denotes a solder material on the backside, and 1a denotes an exhaust gas inlet side end face. The honeycomb carrier had an unjoined area of a length of 7.5% of the length of the metal honeycomb core body from the exhaust gas inlet side end face, and the metal honeycomb core body was joined with three joining stripes perpendicular to the axial direction on the same surface. Further, the average joining interval of the flat plate and the corrugated plate was about 48 μm.

A catalyst was carried on this metal carrier, and subjected to a heat cycle test (1,000° C.×30 min→cooling×10 min). After the test for 300 hours, the metal carrier of the present invention showed no breakage of the foil except for a slight cell deformation. Further, to test durability to vibrations, the metal carrier was tested at vibration frequencies of 20 to 500 Hz, an acceleration of 30G, for 20 hours. As a result, no defects such as dislocation of the metal honeycomb core body, breakage of the soldered portion, or the like were noted.

EXAMPLE 3

Figure 16:
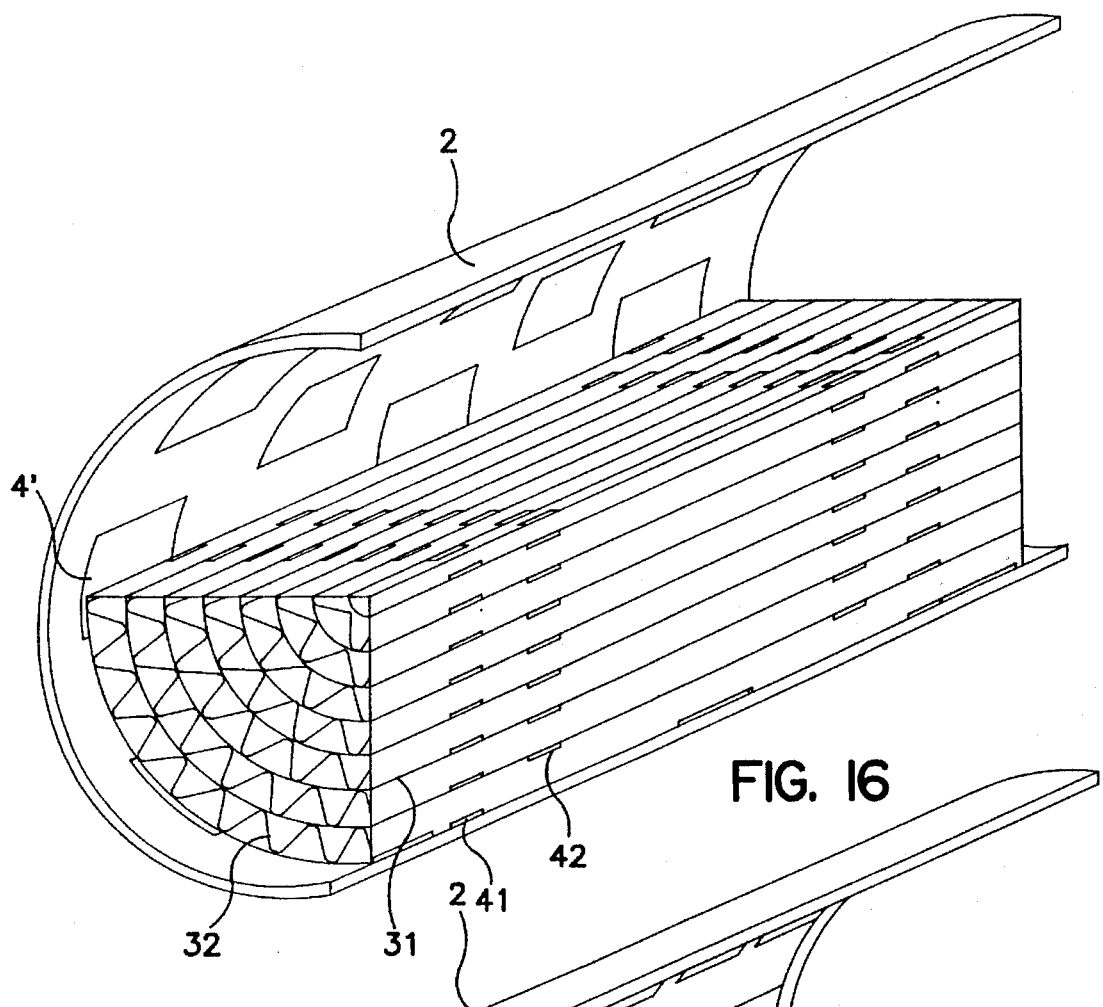
FIG. 16 is a schematic cross sectional perspective view showing soldering condition of the metal carrier of Example 3 of the present invention.

A corrugated plate 32, formed by corrugating a 50 μm thick ferrite-type stainless steel flat plate 31, was supplied on the surface and backside with a slurry comprising a powder-formed solder material under 50 μm and a water-soluble binder from a nozzle at a position of 15 mm from the end face on the surface, and at a position of 25 mm from the end face on the backside, stacked with a flat plate and wound round to form a metal honeycomb core body. Next, a slurry comprising the powder-formed solder material and an organic binder was coated on an inner surface of a 1.5 mm thick metal outer cylinder 2 on both end faces and in a width of 10 m from a position 20 mm apart from both end faces in the axial direction of the metal honeycomb core body, and in a length of 8 mm at eight-divided positions in the peripheral direction. Further, the slurry was coated at the center of the metal honeycomb core body in a width of 15 mm and in a length of 8 mm at eight-divided positions in the peripheral direction. After the slurry was coated intermittently in the axial and peripheral directions and dried, the above metal honeycomb core body was pressed into the metal outer cylinder 2. After that, vacuum soldering (heated at 1,200° C. for 20 minutes, $10^{-5}$ torr) was performed to prepare a metal carrier. Structure of the metal carrier prepared by this method is shown in FIG. 16. In FIG. 16, the reference numeral 41 denotes a solder material on the surface, 42 denotes a solder material on the backside, and 4 denotes the solder material between the metal outer cylinder and the metal honeycomb core body. A catalyst was carried on this metal carrier, and subjected to a durability test combining a heat cycle test with a vibration test (heat cycle test: 1,000° C.×12 min→forced cooling×30 min, exhaust gas flow: 10 m³/min, vibration test: frequencies of 20 to 500 Hz, an acceleration of 30G, a sweep time of 5 min (sine)). After the test for 300 hours, the metal carrier of the present invention showed no breakage of the foil except for a slight cell deformation in the metal honeycomb core body comprising the corrugated plate and the flat plate.

EXAMPLE 4

Figure 17:
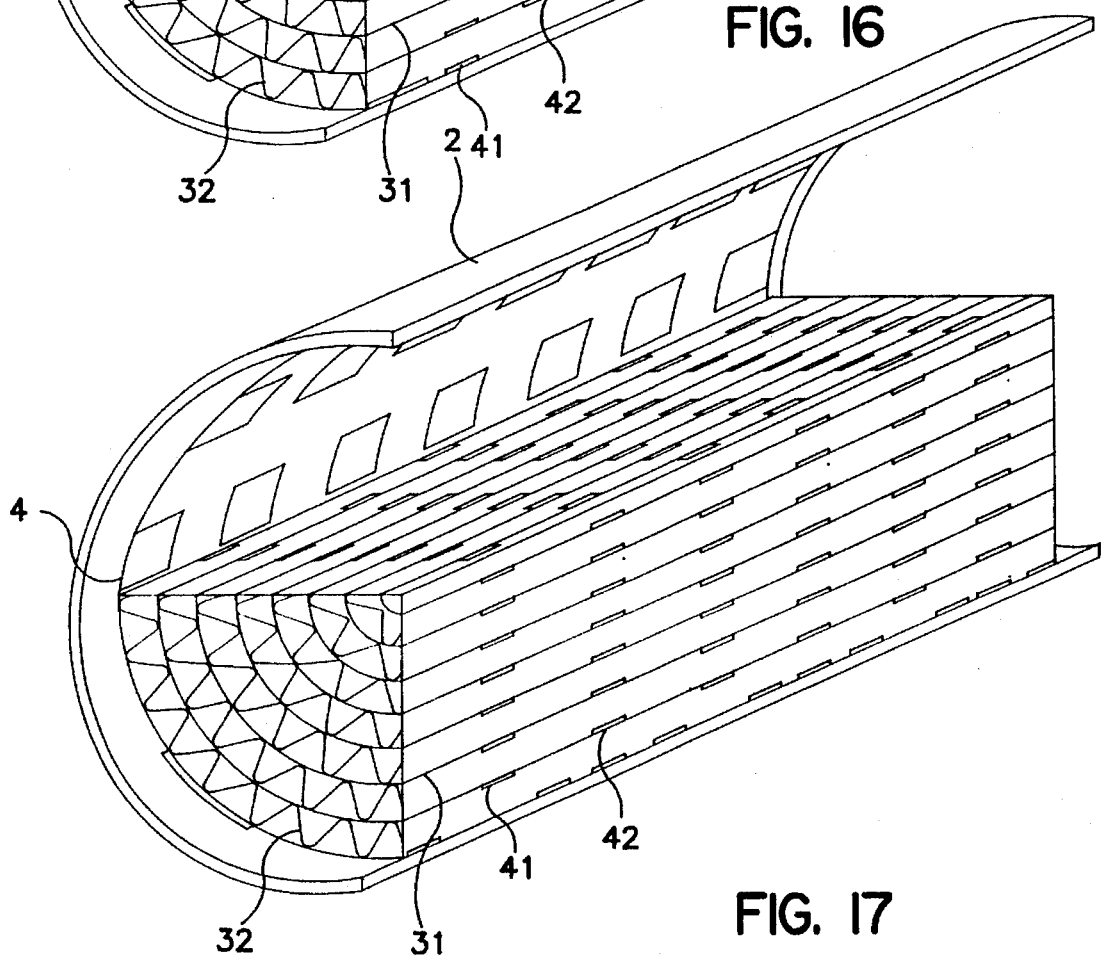
FIG. 17 is a schematic cross sectional perspective view showing soldering condition of the metal carrier of Example 4 of the present invention.

A corrugated plate 32, formed by corrugating a 50 μm thick ferrite-type stainless steel flat plate 31, was supplied on the surface and backside with a slurry comprising a powder-formed solder material under 50 μm and a water-soluble binder from a nozzle at positions of 25 mm, 65 mm, and 85 mm, respectively, from the end face on the surface of the metal honeycomb core body, and at positions of 10 mm, 40 mm, and 70 mm, respectively, from the end face on the backside, stacked with a flat plate and wound round to form a metal honeycomb core body. Next, a slurry comprising the powder-formed solder material and an organic binder was coated on an inner surface of a 1.5 mm thick metal outer cylinder 2 in a width of 5 mm in the axial direction on the end face and at positions 15 mm, 30 mm, 45 mm, 60 mm, 75 mm, and 90 mm, respectively, from the end face of the metal honeycomb core body and in a length of 8 mm at eight-divided positions in the peripheral direction. After the slurry was coated intermittently in the axial and peripheral directions and dried, the metal honeycomb core body was pressed into the metal outer cylinder. After that, vacuum soldering (heated at 1,200° C. for 20 minutes, $10^{-5}$ torr) was performed to prepare a metal carrier. The soldering structure of the metal carrier is shown in FIG. 17. A catalyst was carried on this metal carrier, and subjected to a durability test combining a heat cycle test with a vibration test (heat cycle test: 1,000° C.×12 min→forced cooling×3 min, exhaust gas flow: 10 m³/min, vibration test: frequencies of 20 to 500 Hz, and acceleration of 30G, a sweep time of 6 min (sine)). After the test for 300 hours, the metal carrier of the present invention showed no breakage of the foil except for a slight cell deformation in the metal honeycomb core body comprising the corrugated plate and the flat plate.

COMPARATIVE EXAMPLE 1

Figure 13:
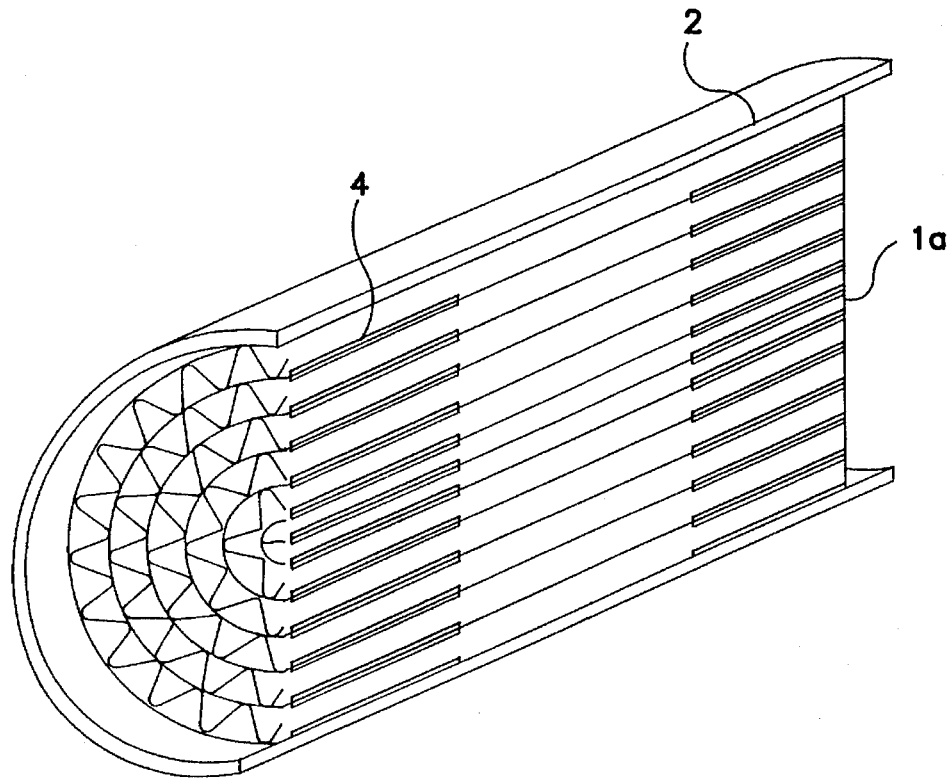
FIG. 13 is a schematic cross sectional perspective view showing soldering condition of the metal carrier of Comparative Example 1.

A 50 μm thick ferrite-type stainless steel flat plate and a corrugated plate, formed by corrugating the flat plate, were wound round to form a cylindrical metal honeycomb core body, which was inserted into an outer cylinder made of a 1.5 mm thick ferrite-type stainless steel, coated with a solder material by dipping in a width of 15 mm from the exhaust gas inlet side and outlet side end faces, and subjected to vacuum soldering (heated at 1,200° C. for 20 minutes, $10^{-5}$ torr) to prepare a metal carrier. The resulting metal carrier is shown in FIG. 13. In the Figure, the a solder material 4 is coated at the same position on the surface and backside of the corrugated plate. A catalyst was carried on the metal carrier, and subjected to a heat cycle test (1,000° C.×30 min.→cooling×10 min.). As a result, cell deformation and breakage in the foil on the outer periphery of the metal honeycomb core body were noted after 83 hours of test. Further, after a vibration test at vibration frequencies of 20 to 500 Hz, an acceleration of 30G, for 20 hours, dislocation in the metal honeycomb core body and breakage in the joined portion were noted.

COMPARATIVE EXAMPLE 2

Figure 14:
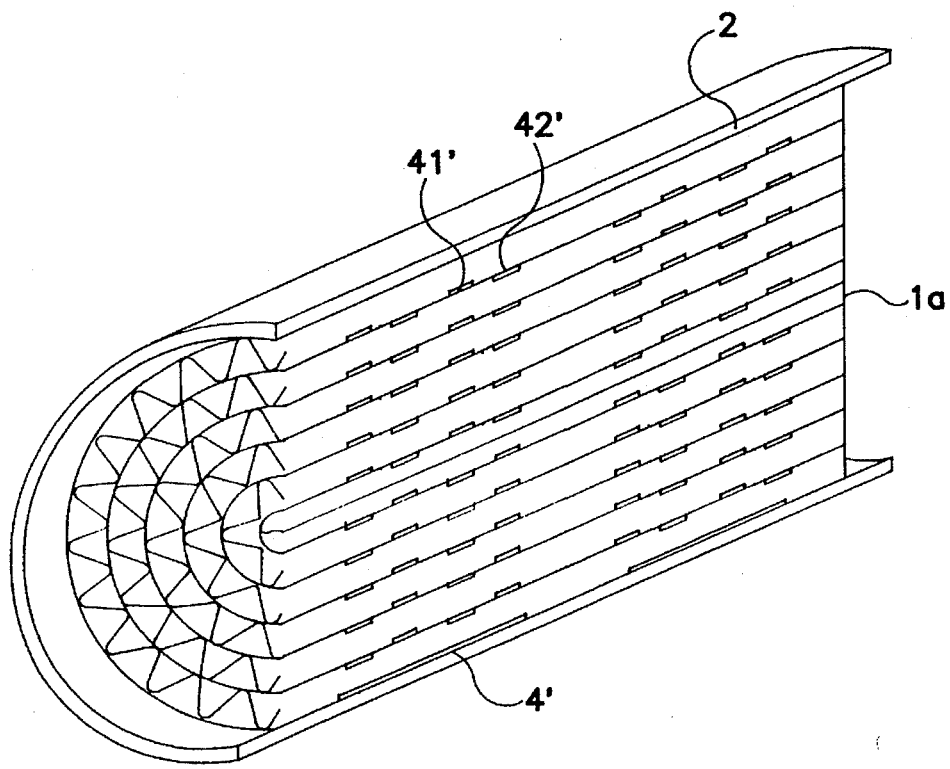
FIG. 14 is a schematic cross sectional perspective view showing soldering condition of the metal carrier of Comparative Example 2.

A corrugated plate, formed by corrugating a 50 μm thick ferrite-type stainless steel flat plate, was stacked with a flat plate and wound round to prepare a honeycomb core. During the step, a 20 μm thick, 2 mm wide amorphous foil solder 41' was supplied at positions of individually 5 mm and 15 mm from the end face on the surface, and at positions of 10 mm and 20 m from the end face on the back side, and both plates were stacked and wound round to prepare a honeycomb core. Further, a 15 mm wide amorphous foil solder 4 was wound at a position 5 mm apart from the end face on the outer periphery of the metal honeycomb core body, pressed into a 1.5 mm thick metal outer cylinder, and subjected to vacuum soldering (heated at 1,200° C. for 20 minutes, $10^{-5}$ torr) to prepare a 50 mm diameter, 50 mm long metal carrier (length of metal honeycomb core body: 40 mm). The metal carrier is shown in FIG. 14. In FIG. 14, the reference numeral 41' denotes a portion soldered with the amorphous foil solder on the surface of the corrugated plate, and 42' denotes a portion soldered with the amorphous foil solder on the backside of the corrugated plate. The metal carrier had an unjoined area of 10% of the length of the metal honeycomb core body from the end face as in Example 1, and the metal honeycomb core body was joined with four joining stripes perpendicular to the axial direction on the same surface.

A catalyst was carried on this metal carrier, and subjected to a heat cycle test (1,000° C.×30 min.→cooling×10 min.). After the test for 300 hours, the metal carrier showed slight cell deformation, and cracks were noted in the portions joined with the amorphous foil solder. Further, after a vibration test at vibration frequencies of 20 to 500 Hz, an acceleration of 30G, for 20 hours, breakage occurred at the portion soldered with the amorphous foil solder, and a dislocation was noted in the metal honeycomb core body.

Further, since the amorphous foil solder contains boron, considerable oxidation of the joined portions was noted.

COMPARATIVE EXAMPLE 3

Figure 15:
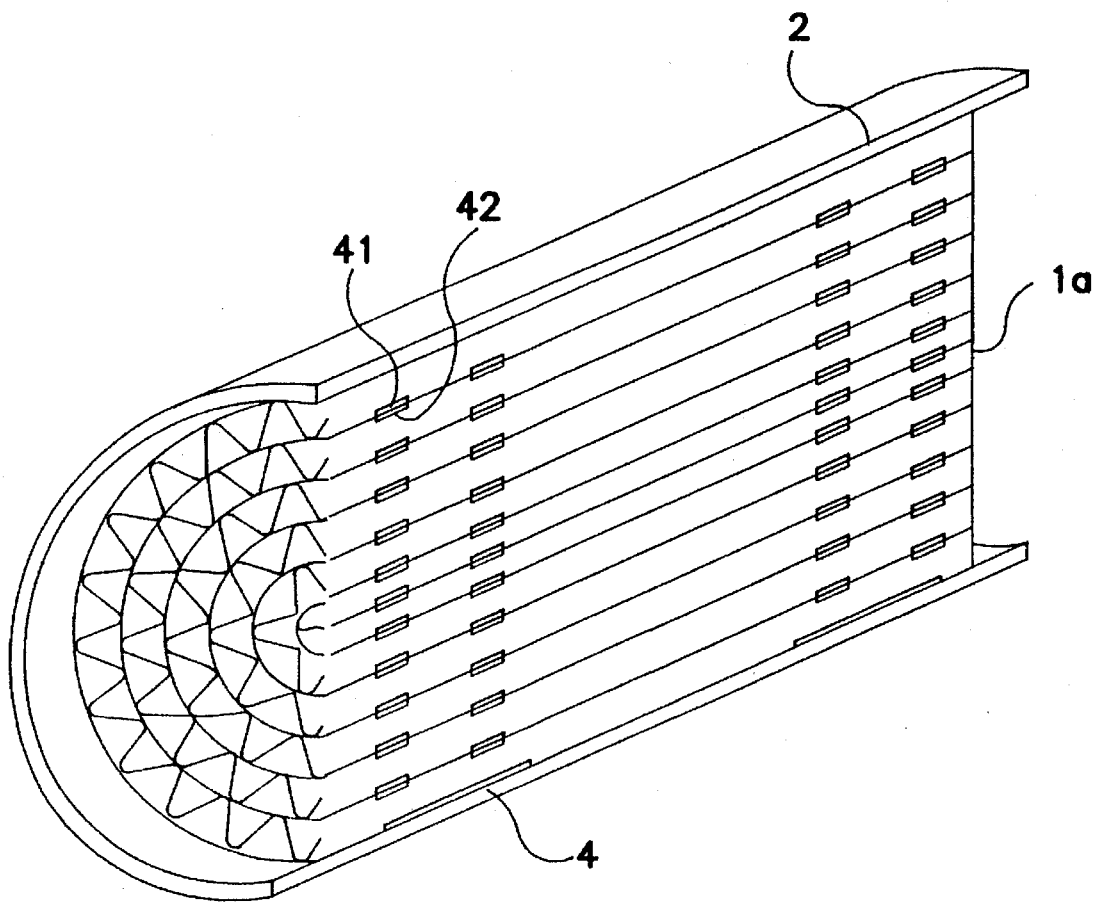
FIG. 15 is a schematic cross sectional perspective view showing soldering condition of the metal carrier of Comparative Example 3.

A corrugated plate, formed by corrugating a 50 μm thick ferrite-type stainless steel flat plate, was coated on the surface and backside with a slurry comprising a powder-formed solder material under 50 μm and a water-soluble binder at positions of 5 mm and 15 mm from the end face, stacked with a flat plate and wound round to prepare a metal honeycomb core body. Next, a slurry comprising the powder-formed solder material and an organic binder was coated on an inner surface of a 1.5 mm thick metal outer cylinder in a width of 15 mm from a position 5 mm apart from the end face and, after drying, the metal honeycomb core body was pressed into the metal outer cylinder. After that, vacuum soldering (heated at 1,200° C. for 20 minutes, $10^{-5}$ torr) was performed to prepare a 50 mm diameter, 50 mm long metal carrier (length of metal honeycomb core body: 40 mm). The resulting metal carrier is shown in FIG. 15. The metal honeycomb core body after vacuum soldering had an unjoined area between the flat plate and corrugated plate. Further, the joined portion of the flat plate and corrugated plate has a solder material thickness of 120 μm. The metal carrier had only half the punching strength of Example 1 at the solder material portion.

COMPARATIVE EXAMPLE 4

Figure 18:
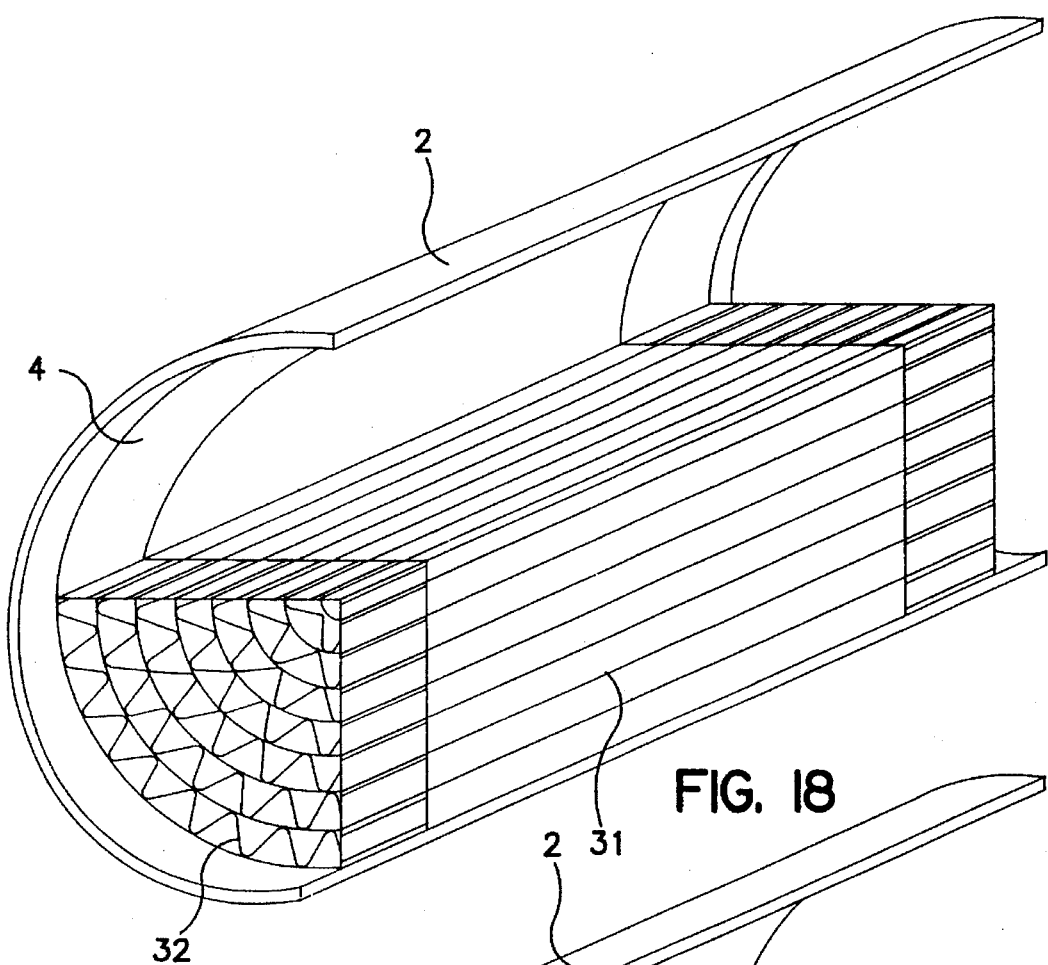
FIG. 18 and FIG. 19 are individually schematic cross sectional perspective views showing soldering condition of the metal carriers of Comparative Examples 4 and 5 of the present invention.

A corrugated plate 32, formed by corrugating a 50 μm thick ferrite-type stainless steel flat plate 31, was stacked with the flat plate and wound round to prepare a metal honeycomb core body, a 20 μm thick, 10 mm wide foil solder was wound round the individual end face of the metal honeycomb core body, and the metal honeycomb core body was pressed into a 1.5 mm thick metal outer cylinder 2. Then, a slurry comprising a powdered solder material and a binder was coated by dipping in a width of 10 mm from the end face of the metal honeycomb core body. After that the metal honeycomb core body was subjected to soldering (heated at 1,200° C. for 20 minutes, $10^{-5}$ torr) to prepare a metal carrier. The soldering structure of the metal carrier is shown in FIG. 18. A catalyst was carried on this metal carrier, and subjected to a durability test combining a heat cycle test with a vibration test (heat cycle test: 1,000° C.×12 min→forced cooling×3 min, exhaust gas flow: 10 m³/min, vibration test: frequencies of 20 to 500 Hz, an acceleration of 30G, a sweep time of 5 min (sine)). After the test for 100 hours, the metal carrier showed a breakage in about 60% of the periphery, and generation of a telescope.

COMPARATIVE EXAMPLE 5

Figure 19:
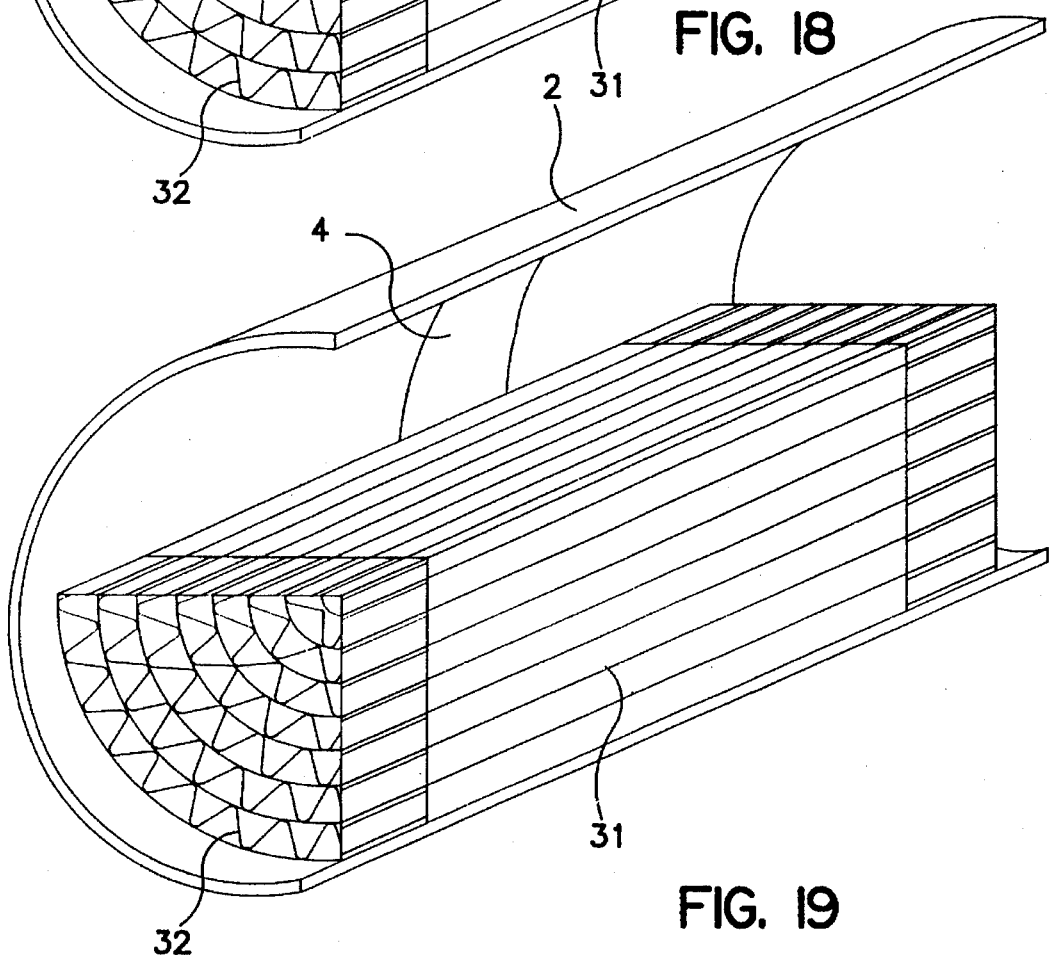

A corrugated plate 32, formed by corrugating a 50 μm thick ferrite-type stainless steel flat plate 31, was stacked with the flat plate and wound round to prepare a metal honeycomb core body. A slurry comprising a powdered solder material and a binder was coated by dipping in a width of 10 mm from the end face of the metal honeycomb core body, and subjected to soldering (heated at 1,200° C. for 20 minutes, $10^{-5}$ torro to prepare a metal honeycomb core body. Then, a 20 μm thick, 10 mm wide foil solder was wound round the center of the metal honeycomb core body, the metal honeycomb core body was pressed into a 1.5 mm thick metal outer cylinder 2, and again subjected to soldering to prepare a metal carrier. The soldering structure of the metal carrier is shown in FIG. 19. A catalyst was carried on this metal carrier, and subjected to a durability test combining a heat cycle test with a vibration test (heat cycle test: 1,000° C.×12 min→forced cooling×3 min, exhaust gas flow: 10 m³/min, vibration test: frequencies of 20 to 500 Hz, an acceleration of 30G, a sweep time of 5 min (sine)). After the test for 80 hours, because the soldered portion between the metal honeycomb core body and the metal outer cylinder was broken, a dislocation occurred in the metal honeycomb core body in the axial direction of the metal carrier.

UTILIZABILITY IN INDUSTRY

With the use of the honeycomb structure and the production method thereof according to the present invention, an exhaust gas cleaning metal carrier for automobiles, autobicycles, and industrial equipment, which is superior in durability, could be achieved.

We claim:

1. A method for producing an exhaust gas cleaning metal carrier in the form of a metal honeycomb core body formed by winding a stack of a flat plate and a corrugated plate, with the core being inserted into a metal outer cylinder, said method comprising conveying a corrugated plate having peaks on each opposed surface thereof through a slurry coating zone;

applying to the peaks of corrugations on each of the opposed surfaces of the corrugated plate while the corrugated plate is being conveyed through the slurry coating zone a plurality of parallel rows of spots or stripes of slurry comprising powder-formed solder material and binder, such that each parallel row on one surface is offset with respect to the next adjacent parallel row on the opposed surface, and while controlling the amount of slurry such that the thickness of the solder material in the to be soldered portions of the flat plate and corrugated plate is 100 μm or less;

stacking the slurry coated corrugated plate and a flat plate;

winding the stack to form the metal honeycomb core body;

coating a slurry comprising powder-formed solder material and binder in the form of a plurality of stripes on an inner wall surface of the metal outer cylinder, said stripes being offset from an end face of the metal honeycomb core body a distance corresponding to more than 5% of the length of the metal honeycomb core body;

pressing the metal honeycomb core body into the metal outer cylinder; and joining the core body and outer cylinder by soldering the applied stripes of solder.

2. The method of claim 1 further comprising spreading the spots or stripes of slurry applied to the peaks of the corrugated plate in the longitudinal and cross directions to make the coating thickness more uniform.

3. The method of claim 1 further comprising forming a plurality of said metal honeycomb core bodies and pressing said plurality of core bodies in the axial direction into the metal outer cylinder.

4. A method of producing an exhaust gas cleaning catalyst including at least one metal honeycomb core body inserted in the axial direction into a metal outer cylinder, comprising coating a flowable slurry comprising powder formed solder material and binder in the form of spots or stripes on the peaks of corrugation of a corrugated plate;

stacking the coated corrugated plate and a flat plate and winding the resulting stack to form the metal honeycomb core body;

applying stripes of flowable solder material on an inner wall surface of said metal outer cylinder;

drying the flowable solder material on the inner wall surface;

pressing at least one said metal honeycomb core body into said metal outer cylinder while the flowable slurry on the peaks of corrugation maintains its fluidity;

curving the metal outer cylinder to a desired curvature;

drying the flowable slurry on the peaks of corrugation; and, applying sufficient heat to effect soldering of said metal honeycomb core to said metal outer cylinder.

5. A method of producing an exhaust gas cleaning metal carrier including a plurality of metal honeycomb core body inserted in the axial direction into a curved metal outer cylinder, comprising coating a flowable slurry comprising powder formed solder material and binder on the peaks of corrugation of a corrugated plate;

stacking the coated corrugated plate and a flat plate and winding the resulting stack to form the metal honeycomb core body;

providing a curved metal outer cylinder;

applying stripes of flowable solder material on an inner wall surface of said curved metal outer cylinder;

drying the flowable solder material on the inner wall surface;

pressing said plurality of metal honeycomb core body into said curved metal outer cylinder while the flowable slurry maintains its fluidity;

curving the metal outer cylinder to a desired curvature;

drying the flowable slurry on the peaks of corrugation; and, applying sufficient heat to effect soldering of said metal honeycomb core to said curved metal outer cylinder.

6. The method of claim 5 which further comprises an additional step of further curving the curved metal outer cylinder.

7. The method of any one of claim 1, 4, or 5, wherein the powder formed solder material has a particle size of 50 μm or less.

8. The method of claim 1 wherein the step of applying spots or stripes of slurry to the peaks of corrugations further comprises applying said spots or stripes such that there is a solder-free portion over at least 5% of the length of the honeycomb core body from at least one end face thereof.

9. The method of claim 8 wherein in each row of spots or stripes of slurry applied to peaks of corrugation the spots or stripes are spaced to provide solder-free portions having a length which is more than 5% of the length of the metal honeycomb core body.

10. The method of claim 9 wherein the stripes of solder joining the core body and outer cylinder are offset from the solder material in the outermost periphery of the honeycomb.

11. The method of claim 4 or claim 5 wherein the step of coating a flowable slurry in the form of spots or stripes on the peaks of corrugation comprises coating the slurry in the form of spots or stripes under conditions such that slurry-free portions having a length of at least 5% of the length of the metal honeycomb core body are present from an end face thereof and between the spots or stripes of slurry.

12. The method of claim 10 wherein said steps of applying stripes of flowable solder on an inner wall surface of said metal outer cylinder and pressing at least one said metal honeycomb core body into said metal outer cylinder cause the dried flowable solder material on the inner wall surface to be offset from the flowable slurry on the peaks of corrugation at the periphery of the metal honeycomb core body.

* * * * *